US012608488B2

(12) United States Patent
Coffing

(10) Patent No.: US 12,608,488 B2
(45) Date of Patent: Apr. 21, 2026

(54) EXCHANGING USER INFORMATION WITH OTHER PHYSICALLY PROXIMATE USERS

(71) Applicant: Daniel L. Coffing, Fairfax, VA (US)

(72) Inventor: Daniel L. Coffing, Fairfax, VA (US)

( * ) Notice: Subject to any disclaimer, the term of this patent is extended or adjusted under 35 U.S.C. 154(b) by 626 days.

(21) Appl. No.: 17/987,707

(22) Filed: Nov. 15, 2022

(65) Prior Publication Data

US 2023/0075978 A1    Mar. 9, 2023

Related U.S. Application Data

(60) Continuation of application No. 17/342,499, filed on Jun. 8, 2021, now Pat. No. 11,501,004, which is a division of application No. 16/358,304, filed on Mar. 19, 2019, now Pat. No. 11,030,326, which is a continuation-in-part of application No. 15/397,432, filed on Jan. 3, 2017, now Pat. No. 10,237,359, which is a continuation-in-part of application No. 13/917,241, filed on Jun. 13, 2013, now Pat. No. 9,600,674, which is a continuation of application No. 12/285,689, filed on Oct. 10, 2008, now abandoned, which is a continuation-in-part of application No. 11/489,435, filed on Jul. 20, 2006, now Pat. No. 7,962,157.

(60) Provisional application No. 60/996,307, filed on Nov. 9, 2007.

(51) Int. Cl.
*G06F 21/60* (2013.01)
*H04L 9/40* (2022.01)
*H04L 51/58* (2022.01)
*H04L 67/54* (2022.01)
*H04W 4/21* (2018.01)
*H04L 67/306* (2022.01)

(52) U.S. Cl.
CPC .............. *G06F 21/60* (2013.01); *H04L 51/58* (2022.05); *H04L 63/104* (2013.01); *H04L 67/54* (2022.05); *H04W 4/21* (2018.02); *H04L 63/0838* (2013.01); *H04L 67/306* (2013.01)

(58) Field of Classification Search
CPC .. G06F 21/60; G06F 16/9554; G06F 21/6245; H04L 51/58; H04L 63/104; H04L 67/54; H04L 63/0838; H04L 67/306; H04W 4/21; H04W 4/025; G06Q 50/01; G06Q 10/10
USPC ....................................... 455/414.1; 370/338
See application file for complete search history.

(56) References Cited

U.S. PATENT DOCUMENTS

2007/0064624 A1 *    3/2007    Finn .................... H04L 12/4625
                                                                     370/254

* cited by examiner

*Primary Examiner* — Marcos Batista

(57) ABSTRACT

A wireless face-to-face bilateral communication method between at least two users of a service provider, each having a token device, and at least one having a user-defined profile, comprising: between a sending token device and a receiving token device, transmitting unique electronic transaction tokens between a consenting sending party and a consenting or optionally consenting receiving party wherein said transaction tokens may be used for single use, party-approved after-contact, computer-network facilitated access to each other's profile.

20 Claims, 18 Drawing Sheets

400

Authenticating a Profile

500

Token Process Flow

210

1500

User A

Authentication Server

Database

B

Authentication Server

Database

Internet
260

User B

C

Authentication Server

Database

D

Authentication Server

Database

1600

Display, e.g., User B's Profile Information

Convey, e.g., User B's Profile Information

Send E-mail

Send TXT message

Send IM

Initiate telephone call

Printed or electronic document

User A

GUI

Authentication Server

Database

1700

EXCHANGING USER INFORMATION WITH OTHER PHYSICALLY PROXIMATE USERS

CROSS-REFERENCE TO RELATED APPLICATIONS

This application is a continuation of U.S. patent application Ser. No. 17/342,499 filed Jun. 8, 2021, now U.S. Pat. No. 11,501,004, which is a division of U.S. patent application Ser. No. 16/358,304 filed Mar. 19, 2019, now U.S. Pat. No. 11,030,326, which is a continuation-in-part of U.S. patent application Ser. No. 15/397,432 filed Jan. 3, 2017, now U.S. Pat. No. 10,237,359, which is a continuation-in-part of U.S. patent application Ser. No. 13/917,241 filed Jun. 13, 2013, now U.S. Pat. No. 9,600,674, which is a continuation of U.S. patent application Ser. No. 12/285,689 filed Oct. 10, 2008, which claims the priority benefit of U.S. provisional patent application No. 60/996,307 filed Nov. 9, 2007; U.S. patent application Ser. No. 12/285,689 is also a continuation-in-part of U.S. patent application Ser. No. 11/489,435 filed Jul. 20, 2006, now U.S. Pat. No. 7,962,157, which are incorporated by reference herein in their entirety.

BACKGROUND OF THE INVENTION

1. Field of the Invention

The present invention relates generally to electronically aided exchange of information between social and business contacts using controlled access technologies, and more particularly, to the use of token authentication to control access to protected information in a contact's profile.

2. Description of the Related Art

The traditional way of exchanging information between parties who are in the same physical location is by the physical exchange of business or contact cards. An individual who is actively engaged in any sort of social or business networking will end up being encumbered by numerous business cards carrying no more than names, addresses and phone numbers and no other way of actively assessing the business or social compatibility of the card provider and there is no active tie to the party's online profile.

Where parties are not in the same physical location, on-line dating and social networking constitute internet-facilitated modalities for meeting persons particularly in social engagements.

In on-line dating, members complete user profiles that are kept in a central database. Users can then search the central database to further their social interests. Upon identifying compatible social interests, messages are exchanged via the intermediation of the service provider.

In social-networking services, users fill out profile information that is stored in a central database. Those profiles are associated with other users in an internodal network arrangement where each user is linked to one or more third-parties through another user with which they have a pre-existing personal or business relationship. Users employ various search criteria to identify a subset of other users whom they may be interested in meeting and are allowed to contact or view the profiles of other users.

The key limitation of both on-line dating and social networking services is that both are online dominated and do not easily tie in to a user's day to day interaction with the offline universe. In other words, cyber world contact precedes real world contact and there is always the danger that the cyber profile is overly embellished and at marked variance with the real world person.

U.S. Patent Application 20050174975 deals with a wireless communication methodology wherein real world contact coincides with cyber world contact whereby a user may access information about a specific unknown person in their general location in order to decide whether potential compatibilities (either business or personal) may exist between them. In the '975 patent application, a methodology is described whereby a user broadcasts a search for compatible social or business interests in their general physical vicinity, receives and electronically reviews information about a potential contact within his/her vicinity and initiates contact by sending the user's profile back to the potential contact, whereupon it is hoped that real world contact will then ensue. The drawback to this system is that the user spends their time broadcasting and sifting through a myriad of online social protocols, using intelligent devices having image and data display capabilities rather than spending valuable time making the far more profitable flesh to flesh contact.

There is therefore a need for a wireless internet-facilitated networking device and methods of use thereof wherein the real world contact precedes cyber world contact in both social and business intercourse. For socially or professionally active individuals who meet other social or business interests all the time, exchange of cards is often the most convenient way to perpetuate that contact. Even then, business cards as it were, carry very little information, often have no pictures, and remain bland and faceless long after the contact has faded from memory. In social situations in particular, cards are not often available resulting in the inconvenience of locating pen and paper or such. Further, there is often the need to revisit and reassess the social or business compatibility of a contact in a more dynamical setting.

Many electronically aided exchange of information between two previously unknown social or business contacts tend to be too device-dominated in that valuable face to face time is lost viewing and classifying information downloaded on the electronic device. Often, there also exists a need post-contact to further explore the contact in relative anonymity before deciding to share private as opposed to public data.

Nor is social or business contact necessarily limited to natural persons. In bilateral exchange of information facilitated by electronic means, one of the parties could very much be an establishment, such as a government, hospital, or business or event organizer where such electronically aided exchange of information may be used to further a business purpose.

Authentication tokens have been used to promote relatively quick access to secured data and other resources. Physical tokens include objects that are read by an access control device to determine whether a user presenting the token should be given access. As the token holder approaches or otherwise submits the token, the access control device interrogates the token to make the determination.

Tokens of varying costs and complexity have been developed. For instance, tokens routinely incorporate cryptographic mechanisms for authentication. Encrypted codes are commonly stored within token memory for eventual decryption by the access device. To this end, tokens additionally rely on dedicated processors and/or memory for use during authentication. Though not necessarily used for authentication, tokens additionally include a set of generally unalterable data that is set by manufacturers. Such data includes serial numbers, manufacturer identifier data, time of manufacture, and/or other manufacturer controlled information used for inventory, quality control and other accounting purposes.

Bilateral, per transaction, exchange of electronic or digital tokens between persons (natural, business or premises) desiring to further their contact will provide some measure of convenience and security in accessing each other's secured profile in a virtual environment and afford the persons opportunity to further their contact in a real world if mutuality exists.

SUMMARY OF THE INVENTION

Embodiments of the present invention include a wireless device and a per transaction token based system for business and social networking by natural persons or businesses, in which actual contact precedes bilateral (or one way) exchange of tokens for after-contact, computer network facilitated access to each other's user profile, which may include user-defined data, to be followed, optionally by further exchange of private data. Private data as used herein refers to any information, such as profile identification, phone number, Internet address, contact information, financial information, or medical information, which may allow perpetuation of that contact outside the virtual token-enabled environment. As used herein, per transaction token is taken to mean that the token is a disposable, single-use token. In one embodiment, the token may be of finite use rather than a single use, wherein the token may be set to expire over time or may be set to expire after a defined incremental use.

In one embodiment, the present invention includes a wireless face-to-face, bilateral communication method comprising a one-to-one exchange of transaction tokens between at least one sending party and at least one receiving party who are both registered users of a service provider. As used herein, device refers to any wireless electronic token device of the present invention. Where carried by a natural person, said device may be any portable electronic device that is capable of transmitting and/or receiving transaction tokens. In the case of businesses, a token device may be stationary, preferably desktop device, which can communicate with an individual's portable device. Additionally, the information exchange transmission may be an intended transmission without the need for face-to-face proximity of one or more previously unknown or unconnected parties.

In another embodiment, client, a service provider's subscriber, provides credentials (e.g., username and password) for tokens to be preloaded to client's device. Upon verification of the credentials, the service provider issues to the client a plurality of digital transaction tokens. Each digital transaction token may be configured to provide proof of the client's authorization for a social or business contact or to a business premise, such as an event organizer, club house, and/or hospital, to access the corresponding client's profile.

In one implementation, the plurality of transaction tokens may include an authentication token that is configured to provide proof of identity at the service provider's portal and which may be provided by the client to the service provider to obtain additional transaction tokens without requiring the client to resubmit credentials. An application on a client device receives and loads the transaction tokens.

In one implementation, a network server generates the transaction tokens and provides the tokens to a client's device. The transaction token may be provided by the server as part of the code comprising a profile page.

The authentication module authenticates the client's token and returns to the requestor client, a user reply, at the option of the requestee, in the form of a profile of requestee client. In one embodiment, the authentication module verifies that the token is being submitted by a valid user; that the received token being submitted belongs to a valid requestee and that the token is still valid, etc—and then with permission of the requestee discloses the requestee's profile to whatever granular detail desired by the requestee. Additionally, the authentication module may watch for the other part of the transaction pair, i.e., the user submitting the token, should also have the mirror of the other user submitting his/her token to start the reciprocal to the transaction.

Upon encountering a potential social or business contact, exchange of transaction token takes place between the service clients. Preferably, the token exchange is at least a two-way exchange; however, the token exchange may be one way only, i.e., one client offers his/her token to another client, while the other client does not reciprocate with his/her token. Subsequently, the token device application may send a profile request to a service provider's network server. The profile request may include the transaction token optionally embedded in the profile page code of the requesting client rather than delivering the token separately. The server receives the profile request, determines whether the associated token is valid, and processes the request and informs the other party that a reply profile is needed. In the preferred embodiment, the exchange between users is accomplished with only click or button activation.

In one embodiment, the transaction token is embedded in profile page code provided in a profile response. When the profile page code is received and loaded by the browser application, the transaction token is loaded by the browser as well. Thus, the transaction token is optionally maintained in the code of the profile page rather than delivered separately. Once the profile page and token are loaded, the browser application may generate a profile request in response to receiving further user input. The browser application then includes the authentication token from the profile page code in the subsequent profile request.

In yet another embodiment, once the token device has received one or more tokens, typically at the end of the networking event, the client-subscriber or user uploads these tokens to a data server computer system using any suitable means of data communication such as cradles, Bluetooth, or WiFi. In a preferred embodiment, uploading to an Internet-connected computer is done via a universal serial bus (USB) interface on the wireless device In another embodiment, uploading may be done via a wireless communication to the Internet.

In one embodiment, the tokens stored in a receiver's wired or wireless token device may be uploaded to a central service which may include a website, a database and one or many servers. In another embodiment, the user who has uploaded the tokens to the data server logs into a world wide web-interface that allows them to classify their received profiles according to type, group, interest, and/or some other classification. Since the received profile(s) belongs to another registered user of the system, a picture and other general information, excluding private data, may be available to refresh the user's memory of the networking encounter and to determine what the levels of interaction should be. In a preferred embodiment, users may have the ability to determine the granulation of their profile that may be seen by other users, and to set the available channels for future communication, e.g., instant message, email, video teleconference (VTC), phone, gaming, collaboration and/or voicemail, or none at all.

Alternate embodiments include the cases where: 1) user's device communicates with the server via a cable, cradle, or other physical connection to a PC or other electronic apparatus which can relay tokens or other information to the server; or 2) through any form of wireless connection, such as Bluetooth Wi-Fi or 802.11, which may relay the tokens or other information either directly or through some intermediary (e.g., a cellular network or PC) to the server.

It is also an object of the invention to allow users in a business networking contact to classify or characterize the relationship, such that other service-subscriber contacts can electronically access at the option of the subscriber their business contact information, business resume, associates, vendors, product literature, pictures, and so on.

In one embodiment of the invention, an events organizer or business establishment can use a stationary version of this device to gather and store transaction tokens of attendee-subscribers of the event, upload the tokens and have a list of prospects to communicate relevant news and offerings or other information relevant to the event, including confirming the identity of the attendee. In a social networking embodiment, a list of locations frequented or patronized or groups joined may be dynamically visible to one's circle of online friends. Related online profile information may be such things as name, age, phone numbers, email address, zip codes of residence, activity, interests, blogs, photos, etc., depending on the nature and the type of the online community or application being used.

In another embodiment of the invention, facility managers can use stationary versions of the device to register the user's attendance or interest in a particular product or service or display. In that way, a business invitee can leave the location with tokens that allow access to more information and the business establishment has acquired transaction tokens from an inquiry and prospective client.

Similarly, in another embodiment, the stationary version of the token-device may be built into a radio or television receiver, such that when a user sends a token using a portable transaction token device, the user receives a token from the token-transmitting-enabled radio, which is linked within a service provider's database to communicate a particular point in the broadcast programming, for later retrieval by the user online. In this embodiment, it is contemplated that one of the data objects stored in the service provider's database is a time and date stamp for linking the transmitted token to a particular point in the broadcast.

In another embodiment, the sender and receiver's wireless devices exchange transaction tokens using a first local wireless protocol, and the uploading wireless device and a remote web-connected computer are coupled together over a second wireless network.

In yet another embodiment, the present invention includes a computer system coupled to a network, the computer system including software for performing a method comprising storing a plurality of transaction tokens, storing profiles for one or more user-subscribers, associating the transaction tokens with the profile, receiving per-transaction access tokens from a wireless device via a computer interface and accessing the profile associated with the one or more transaction tokens. In one embodiment, the transaction tokens and profiles are stored in a database accessible over the Internet.

In another embodiment, accessing the profile comprises generating a query to a database using the transaction tokens and retrieving information associated with the transaction tokens either in response to the query, or in a preferred embodiment, upon further action by the requestee client.

In yet another embodiment, the present invention includes a wireless token device comprising an external case housing a power supply, a USB interface, a narrow-beam send/receive hardware component, a transmit button, one or more confirmation light-emitting diodes (LEDs), processor, memory, USB transaction software, selector switch, a token counter and internal clock/calendar. In other embodiments, the device is embedded in a watch, a broach, a pendant, a necklace, a ring, an earring, an article of clothing, a clothing label, a wallet or a key-chain. In other embodiments, the device is integrated into a smart card or the like.

The wireless token device of the present invention can be of multiple forms including ones with only the discrete functionality of the present invention, or integrated into or with other devices such as cell-phones, PDA's or music players either through embedded hardware or as a software application. In addition, the devices can have the capability to act as both "sender" and "recipient" (for users interested in sending and receiving tokens), to act only as a sender (for users not interested in receiving tokens) or to act only as a recipient (for users who are interested in receiving tokens). Additionally, particularly in the case of a recipient-only device, one embodiment of the present invention provides that the form-factor can be such that the device appears as a piece of jewelry such as a broach, pendant, ring, earring, or as a clothing label, a key-chain, integrated into a credit-card form-factor, integrated into clothing itself or as some other fashion statement which can be both aesthetically pleasing and alert others that a person is a user of the system.

Additional embodiments of the present invention also include medical applications where a user's online profile may contain medical or other information that may be accessed by a doctor, pharmacist, emergency services technician or other health care provider. Yet another embodiment of the present invention includes software, which can be downloaded into an existing platform to enable it to practice the present invention and perform in the techniques described herein. Thus, in the one case, the user's medical information is stored as their profile and the medical facilities are given granted access by user-initiated exchange of transaction tokens. In another case, the transaction tokens give the medical unit confirmation of identity within their internal data system.

Yet another embodiment of the present invention is the use of the transaction-token system by a retailer/business premises for targeted marketing whereby incentives, loyalty tracking and rewards management, coupons, referrals, ratings etc are part of the retailer's application interface and the consumer's user profile. Accordingly, in the token-enabled virtual environment, the business client always retains the ability to sever the business relationship or control the private information available to the business.

Embodiments of the present invention also include any and all business methods for generating revenue and income through the sales of hardware, software and services that include one or more embodiments of the invention described herein. These include (a) selling software for use on an existing hardware platform to enable the invention, (b) the sale of hardware (including jewelry or other form factors) to enable the invention, (c) charging users on an annual, monthly or per-message basis for use of the service/invention, and (d) a third party receiving links, advertorial content, or other business value in exchange for sponsoring mobile token devices or associated profile services for users. These business methods also include the ability to charge or reward users for the exchange of messages or information processed through one or many central servers based on tokens exchanged earlier between devices as described above. Users of the device and service (i.e., senders, recipients, or both), may include individuals, businesses, not-for-profit organizations, advertisers, political action groups, or any other organization.

A preferred embodiment of the present invention may also include (e.g., as part of the server) a web-based user interface for registration, and token and profile information management. Information managed by users through this interface may include, but is not limited to, the unique identifier (ID) of their mobile device, their name, address, billing information (if applicable), username, profile information, photo, preferences and names of friends. The user interface may also function as a messaging center in which the user can keep track of messages sent or received as well as the profiles that they have been viewed.

Additional embodiments will be evident from the following detailed description and accompanying drawings, which provide a better understanding of the nature and advantages of the present invention.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION OF THE INVENTION

In the following description, for purposes of explanation, specific details are set forth in order to provide a thorough understanding of different aspects of the present invention. It will be evident, however, to one skilled in the art that the present invention as defined by the claims may include some or all of the features or embodiments herein described and may further include obvious modifications and equivalents of the features and concepts described herein.

Embodiments of the present invention use wireless protocols and networks for implementing novel methods and algorithms that obviate the need for non-electronic business and contact cards and allow users to liberally, confidently, and anonymously distribute and gather per-transaction access tokens for use in later classifying and perpetuating the contact at the option of the user-subscriber. Additionally, the per transaction token offers a severability function that allows users to confidently qualify their contacts in a virtual environment and then decide whether to continue or terminate the exchange by denying or granting privileges to real-world contact information.

As used herein, profile refers to any information or resource about the user-subscriber and includes a wide range of resources (e.g., services and content) via a network. For example, profiles may include, but are not limited to, web pages, contact information, schedules, links, friends, activities, social affiliation, feeds, blogs and any combinations thereof. Additionally, profiles may contain tools that allow users to engage in communications via email or instant messaging, photos, use applications, and so forth. In a business setting, profiles may also include, but are not limited to, purchase history, interests, receipts, loyalty points, coupons, referrals, business or system ratings that allow a receiver to make decisions about a product or vendor based on transaction feedback or other system metrics, and so on. In a preferred embodiment, profiles may simply be access means to other communication channels, public or private, or access to health or financial information.

In the case of a business, a profile may include any business or marketing communication, such as product description, business resume, video clip, coupons, receipts, targeted advertisement, event promotion, targeted solicitation, and the like. A profile may be completely virtual in the sense that nothing in the profile bears the real identity of the profile owner. This feature allows the contacts to communicate in virtual anonymity and decide whether there is mutual need to perpetuate the contact by exchanging a real profile, such as a profile that contains private data. Alternatively, at least one contact may have a virtual profile while another contact may have a real (or non-virtual) profile.

Figure 1:
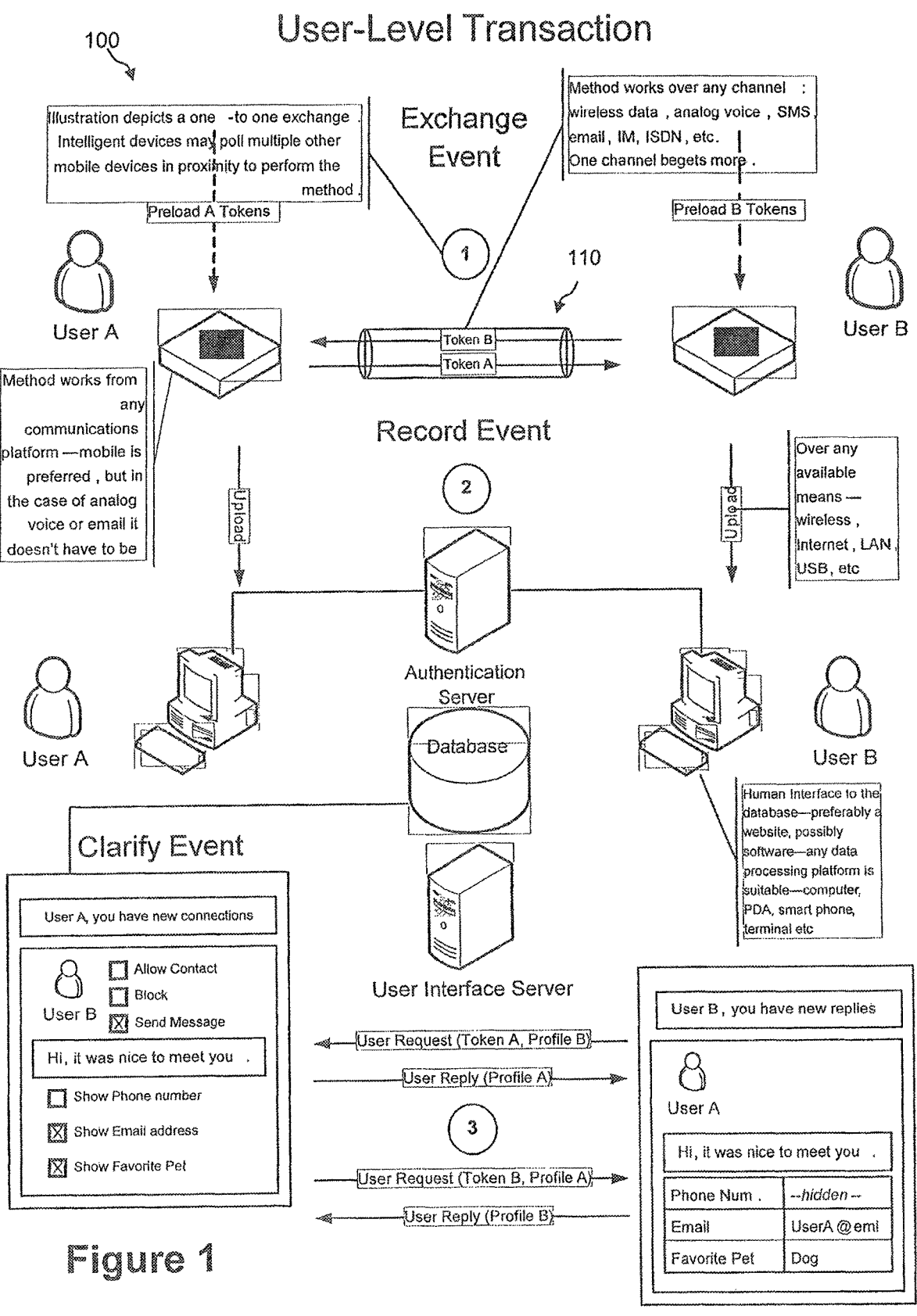
FIG. 1 illustrates a computing environment and an example of a user-level process of the token-exchange, record, and clarification events, according to one embodiment of the invention.

FIG. 1 illustrates a computing environment 100 and an example of a user-level process of the token-exchange (e.g., for business and social networking), record, and clarification events, according to one embodiment of the invention. As shown in FIG. 1, a User A and a User B meet at a networking event and exchange transaction tokens over an adhoc or pre-established communication channel 110. Subsequently, the transaction tokens are uploaded to a network computer by which a requestor profile and the received tokens of the requestee may be passed onto to a service database in order to prompt a reply profile from the requestee. A reply profile may cause the original requestor to be automatically logged out of the requestee's profile after a predetermined period of time or at the instruction of the requestee. A profile may also include a webpage that is associated with the requestee's profile, where at least a portion of the content of the webpage is based on the authorization status embedded in the token and/or the authorization status of the requestor. Also, the reply profile may be a second webpage that has an embedded portion that allows the requestor to log on to an authentication system. In a preferred embodiment, tokens are single-use and are not redistributable from the authorized recipient to another. Further, tokens may be set to expire over time. Tokens may also be of longer duration or fixed to be used in multiple transactions.

Referring to FIG. 1, the reply profile may include messages from the requestee. In one embodiment, User A may re-direct communication with User B to another communication channel. User B may be allowed to communicate with a User C (not shown) on the second communication channel without receiving private data about User C.

The token device may be configured in a variety of ways for accessing the service provider's network. For example, one or more of the token devices may be configured as a computing device, such as a desktop computer, a mobile station, an entertainment appliance, a set-top box that is communicatively coupled to a display device, a wireless phone, a game console, and so forth. Thus, the token device may range from full resource devices that have substantial memory and processor resources (e.g., personal computers, game consoles) to low-resource devices that have limited memory and/or processing resources (e.g., traditional set-top boxes, hand-held game consoles, key fobs). Preferably, the portable token device (e.g., token devices 210A and 210B of FIG. 2) of the present invention for use by individuals is a low-resource device without display capabilities, so that exchange of tokens may occur without tempting the user to spend valuable face to face contact time scrolling through displays.

Figure 2:
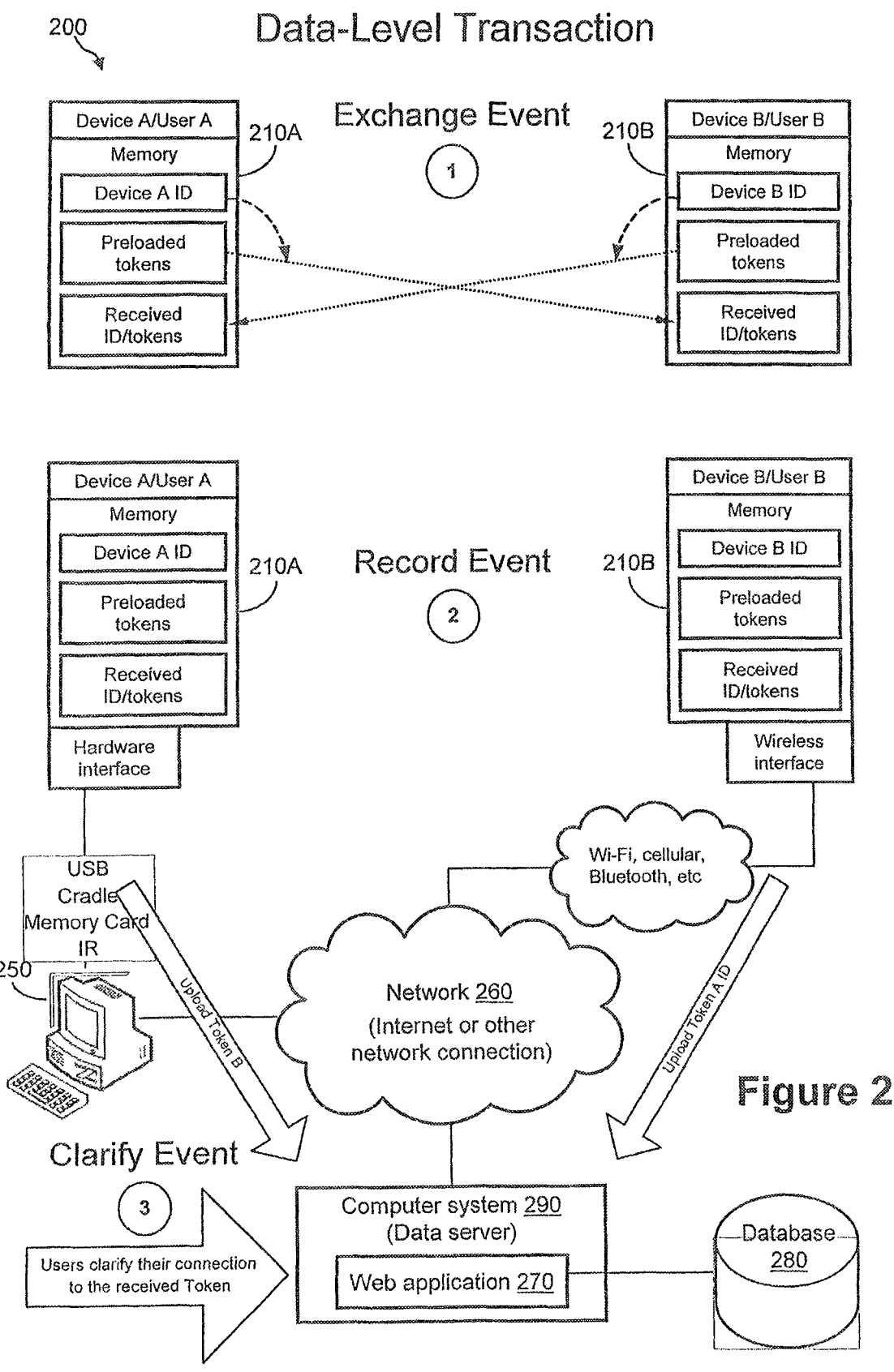
FIG. 2 illustrates a computing environment and an example of a data-level process of the token-exchange, record, and clarification events, according to one embodiment of the invention.

FIG. 2 illustrates a computing environment 200 and an example of a data-level process of the token-exchange (e.g., for business and social networking), record, and clarification events, according to one embodiment of the invention. In particular, FIG. 2 illustrates an embodiment of a computing environment for implementing the present technology. The computing environment shows a network 260, which, preferably, may be the Internet. However, network 260 may assume a wide variety of configurations. For example, network 260 may include a wide area network (WAN), a local area network (LAN), a wireless network, a public telephone network, an intranet, and so on. Further, network 260 may be configured to include multiple networks. For instance, a client may be communicatively coupled via a peer-to-peer network with another client. Each of the clients may also be communicatively coupled to the service provider's authentication module over the Internet. A variety of other configurations are also contemplated.

The system may include one or a plurality of application modules providing for instance, the ability of the users to switch over from a virtual environment to another communication channel. Application modules are executable to provide a variety of functionality to respective clients. For example, one or more of application modules may be configured to send and receive email. In yet another example, one or more of application modules may be configured to send and receive instant messages. And in yet another example, the system may allow a token to pass over an established communication channel, such as email, text messaging, web interface, and/or phone, so as to allow the users to reconnect in another communication channel via the token environment.

Additionally, a wide range of functionality may be made available to clients from one or more service providers as part of their profile. The resources, for instance, may be configured as a variety of content, such as web pages, music, video, images, user forums, templates, add-ins, web logs (i.e., blogs), and so forth. Further, service providers may provide resources which are services, such as instant messaging service, email service, financial service, collaboration environments and so forth. For example, plurality of services may include a web search service (e.g., a search engine) that is provided to search the Internet, an email service that is provided to send and receive email, an instant messaging service that is provided to send instant messages between the clients, and so on.

Figure 3:
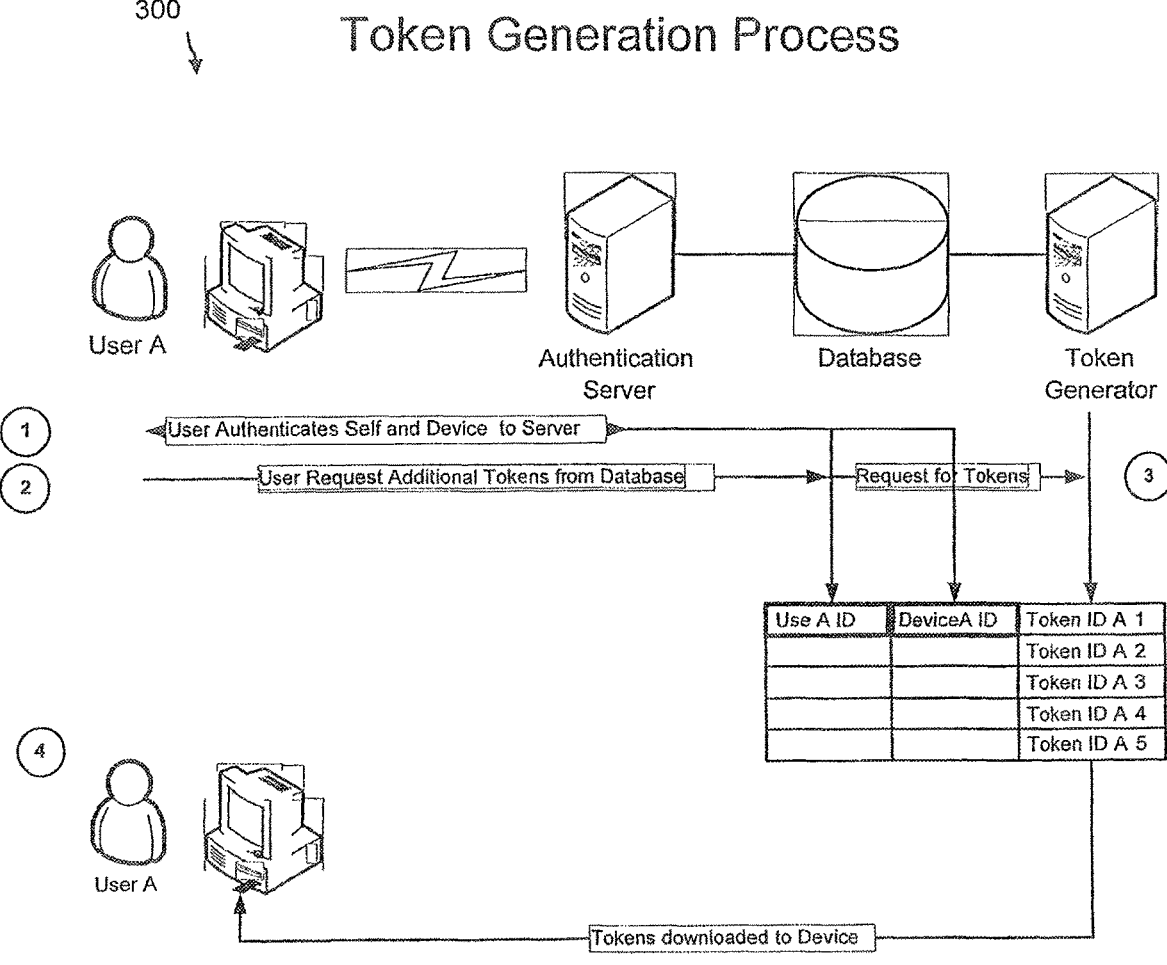
FIG. 3 illustrates a computing environment and an example of a token generation process according to one embodiment of the present invention.

FIG. 3 illustrates a computing environment 300 and an example of a token generation process according to one embodiment of the present invention. A network server generates the transaction tokens. The tokens may be generated by the network server in response to a request from a client token device (for example, a login request). After generating the transaction token, network server provides the token to the client device. In a preferred embodiment, a token is generated and requested by an authenticated user that is logged onto the service provider's website. Tokens generated by the network server may be derived from or associated with a token device ID and/or user ID, or some other portions of the user profile, e.g., an email address or a phone number.

In one embodiment, a client executes an application module, which generates a request to an authentication server. The request may be configured to seek authentication and a plurality of transaction tokens. The authentication service authenticates the request using credentials of the user. The authentication service, in response to the request, provides the user with one or more single use transaction tokens, each of which may then be transmitted to a social or business contact for use for party-approved access to the client's corresponding user profile. In the preferred embodiment of the stationary token device that is located in a business/premises with which a business invitee exchanges tokens, the stationary device is expected to maintain a live connection to the service provider database that then returns the identity, perhaps a picture, for two-factor security and an approval code of some kind.

Figure 4:
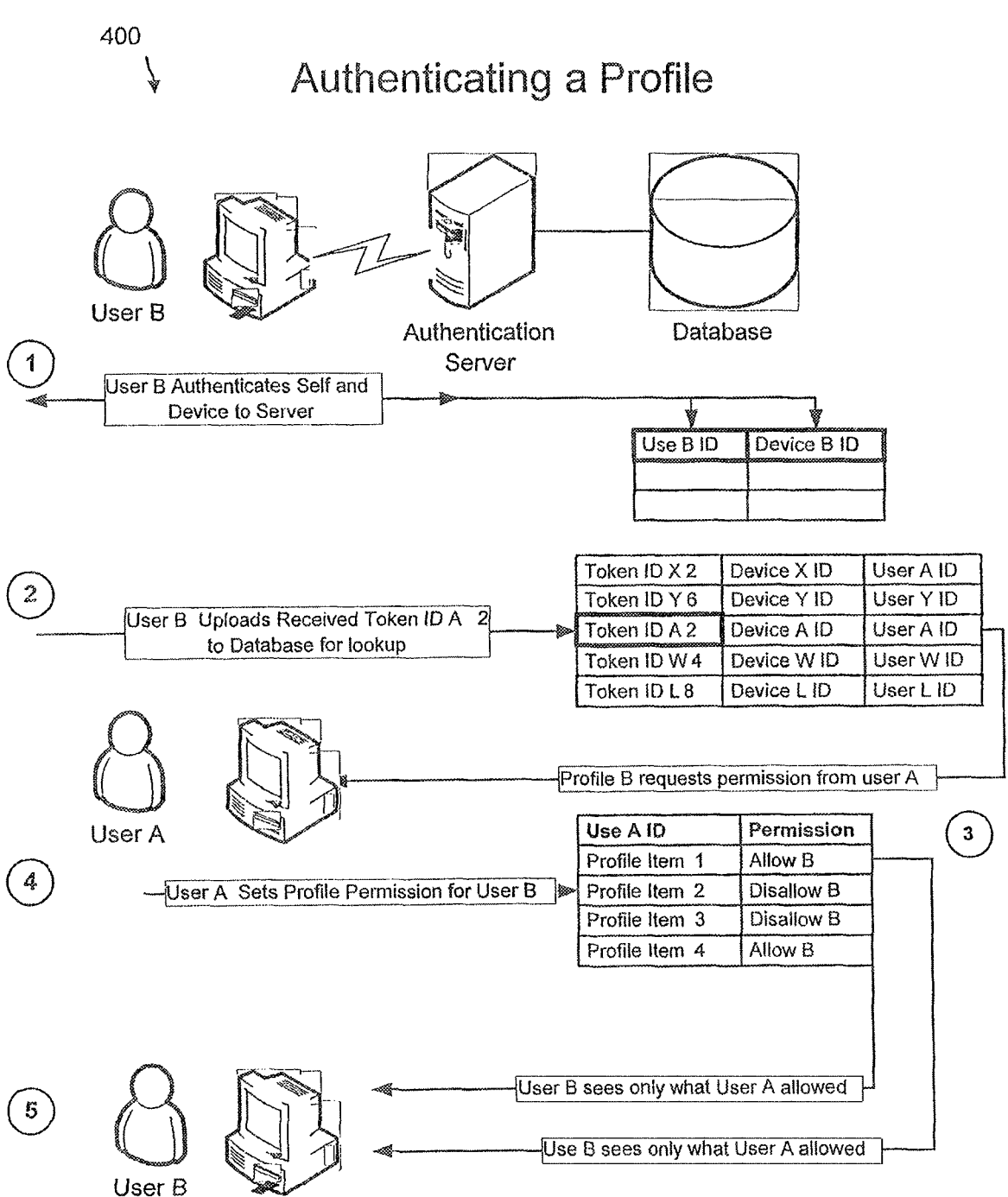
FIG. 4 illustrates a computing environment and an example of a process for authenticating and processing a profile request.

FIG. 4 illustrates a computing environment 400 and an example of a process for authenticating and processing a profile request. Post contact, the request for another party's profile is made and said request is received and loaded by a browser application communicatively linked to the token device. Upon receiving subsequent input, where user input is prompted, the browser application may send a reply profile to the requesting client via the server. The profile request includes the requestee's transaction token that is uploaded to the browser application. The server receives the request having the transaction token and determines whether the token is valid. If the received token is valid, a reply profile is generated, automatically or upon requestee's approval, and sent to the requesting client. If the token is not valid, the requested profile is not provided to the client.

One embodiment of this invention uses a token that requires a one-time transaction encryption. A one-time transaction algorithm generates a password that can be used once only to authenticate a request for the other party's profile. In another embodiment, passwords, user names, and/or other data is used in addition to the device ID, such as serial number or manufacturer ID, as controlled information for realizing token authentication. In one such embodiment, the password is stored in the token and is automatically transmitted to the token device, possibly along with the user ID.

In the preferred embodiment, a given token can be passed once only so as to protect the authenticity of the exchange. To preserve transaction token uniqueness, the token generation server may keep a record of tokens as they are issued to users and as they are returned by contacts with whom they are exchanged. As tokens are submitted with request profiles, the authentication server is then able to (1) ensure that the given token is valid and (2) ensure that the token has not been previously uploaded.

The authentication service may comprise an authentication module and a service module. Authentication module is representative of functionality which may be utilized in order to authenticate a client, which may include verification of client credentials. Authentication module may also comprise client credentials that correspond to respective clients. Client credentials may be used to verify that the clients "are who they say they are" or in other words authenticate the client's identity. The client credentials, for example, may be a user name and password that is supplied by the client. Other client credentials are also contemplated, such as a shared secret, biometric, an encryption key and so forth.

A profile module comprises the functionality that may be utilized to determine profile granulation and which granulated profile a client-contact having the requestee's token is authorized to access. For instance, a profile module of an authentication service may be configured to generate reply profiles that grant access to or re-direct the other party to another communication channel. See FIG. 4.

Naturally, functionality for authentication, token issuance, profile generation, and so forth may be divided differently among various modules of authentication service in different implementations without departing from the spirit and scope thereof.

Generally, any of the functions described herein can be implemented using software, firmware (e.g., fixed logic circuitry), manual processing, and any combinations thereof.

The terms "module," "functionality," and "logic" as used herein generally represent software, firmware, or a combination of software and firmware. In the case of a software implementation, the module, functionality, or logic represents program code that performs specified tasks when executed on a processor (e.g., central processing unit (CPU) or CPUs). The program code can be stored in one or more computer readable memory devices. The features of the transaction token techniques herein described are platform-independent, meaning that the techniques may be implemented on a variety of commercial computing platforms having a variety of processors.

Regarding implementation, the authentication module, when executed on a processor of server, authenticates an authentication request that is sent by a client seeking transaction tokens. For instance, authentication of a request may include accessing and verifying the true use of client credentials. The plurality of client credentials corresponding to a plurality of clients are maintained in storage of memory provided on the server. It is noted that credentials may be maintained on another server of the authentication service or otherwise located remotely in storage. The credentials that are located remotely may be accessible via network.

Credentials indicated in the authentication request may be checked against credentials stored by the authentication service to authenticate the request. In general, credentials are verified by comparing credential information (e.g., name and password) that is provided by the client with client credentials that are accessible to the authentication service (e.g., stored in memory). Client credentials may be verified using numerous authentication schemes, such as by challenge/response, digest, negotiate, NT LAN Manager (NTLM), kerberos, basic (clear text), and so forth. This may include transferring credentials (e.g., clear text) between client and server via the network. Alternatively, a scheme in which user credentials are not sent over the network (e.g., challenge/response) may be used for enhanced security.

Once the authentication request, preferably configured to seek multiple transaction tokens, is authenticated, authentication service is further configured in order to generate a response that corresponds to the request for communication to the client. In particular, the responses are configured to deliver a plurality of transaction tokens in a single request and response round trip between a client and an authentication server. In other words, a plurality of transaction tokens may be obtained in a single transaction.

Naturally, the set of tokens that are requested and received may be configured in a variety of ways. The set of tokens requested and received in a transaction may be specified by default, for instance, in the default configuration of an application module. Further, an option may be provided to a client for specifying which tokens to obtain in an authentication transaction, e.g., one requiring input from requestee before a reply profile is sent, one that sends a reply profile automatically without further input from the user, and/or a token that degrades over time. Accordingly, the token device may optionally contain a switch to select which type of token is to be delivered on a given occasion.

Figure 5:
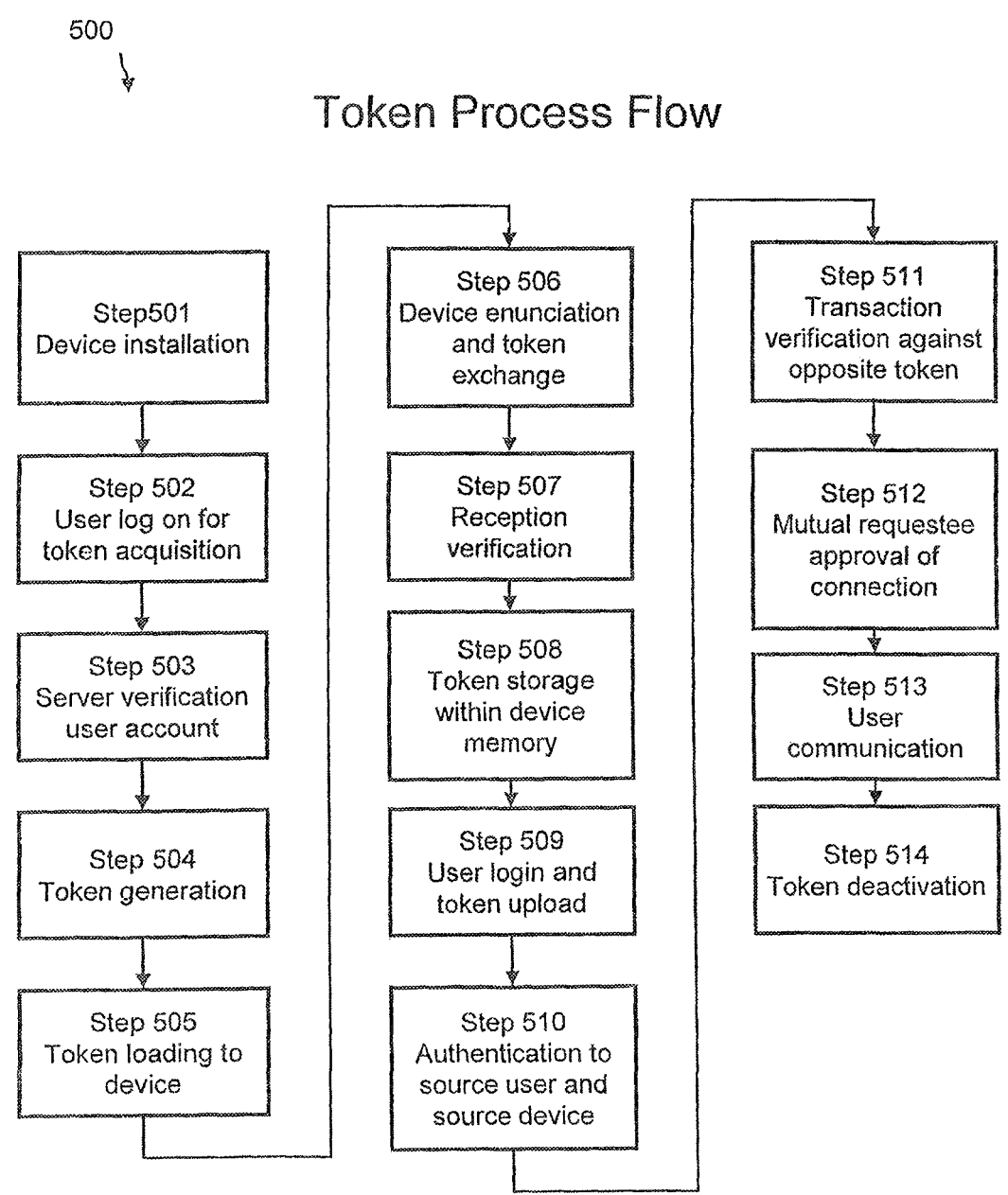
FIG. 5 illustrates a token process flow according to one embodiment of the present invention.

FIG. 5 illustrates a token process flow 500 according to one embodiment of the present invention. In one example, token process flow 500 may include, but is not limited to, the steps of the user installing the device (Step 501) or connecting it to the network. The use logs on the device to reach the authentication server (Step 502), the authentication server verifies the user's account (Step 503). Once a trusted connection is created between the token device and the authentication server, the authentication server generates a token that are associated with the user's profile account and sends the token to the device (Step 504). The device loads the token therein (Step 506). In one embodiment this may be by plugging a USB into computer or authenticating a mobile phone to the token/identity server. Next, depending on the platform the user may be required to credential themselves to the system along with the device so that the identity value of the token device is maintained.

In the face to face interaction, one embodiment of the token process flow in FIG. 5 would continue with the respective users pressing a button or buttons to initiate the transmission of their tokens (Step 506) and the receipt of the respective user's transmitted token (Step 507). At this point each token would be stored in the device memory (Step 508) for subsequent upload to the authentication server (Steps 509-510). Depending on the platform may happen automatically in the case of a mobile Internet attached device or require a similar interface to Step 2 and 3 and again ensure trusted communication between the token device and the identity authentication server.

The last portion of the token flow process under one embodiment would be where the users process the relationship connection between them by the system verifying the authenticity of the two-way exchange (Step 511), then the person to person approval of the connection (Step 512) and then the ongoing communication that may occur (Step 513). In a secure connection the final step with the token server would be to deactivate the particular tokens (Step 514) as a method for ensuring that each transaction is unique in the token address space.

Figure 6:
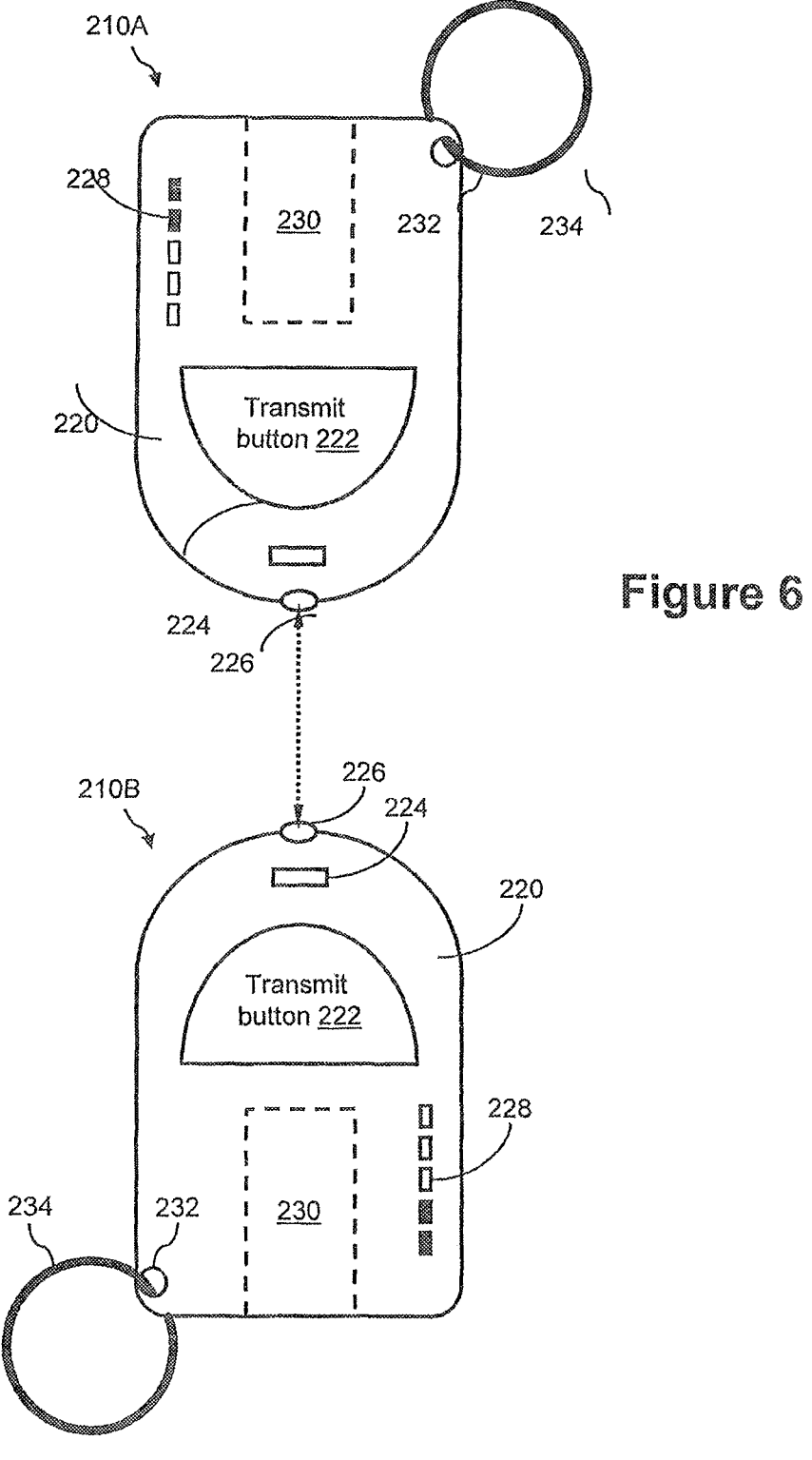
FIG. 6 illustrates a top view of a pair of portable token devices that are communicating in a wireless fashion, in accordance with one embodiment of the present invention.

FIG. 6 illustrates a top view of a pair of portable token devices, such as token devices 210A and 210B of FIG. 2, that are communicating in a wireless fashion, in accordance with one embodiment of the present invention. Each token device 210 may be formed of a housing 220 that includes a transmit button 222 for activating data exchange (e.g., for exchanging tokens), an LED 224 (e.g., a confirm data exchange LED), a wireless interface 226 (e.g., a window for sending and receiving short bursts of data to/from a sister device via, for example, an infrared/radio frequency (IR/RF) emitter), a token counter meter 228, and a hardware interface 230 (e.g., a USB port). The housing 220 of token device 210 may include an opening 232 for installing, for example, a ring 234 therethrough. In one example, ring 234 may be used for attaching token device 210 to a user's key ring.

FIG. 6 shows wireless data exchange between token devices 210A and 210B, which are preferably less than about five feet apart and generally pointed at one another. In another embodiment, the uni-direction transmission range may be extended to about 30 to about 40 ft such that a passive device may receive IDs from interested parties within sight, but not within conversational distance. However, the exchange of tokens may occur over any type of channel, such as wireless data, analog voice, Short Message Service (SMS), email, instant message, and/or Integrated Services Digital Network (ISDN).

Figure 7:
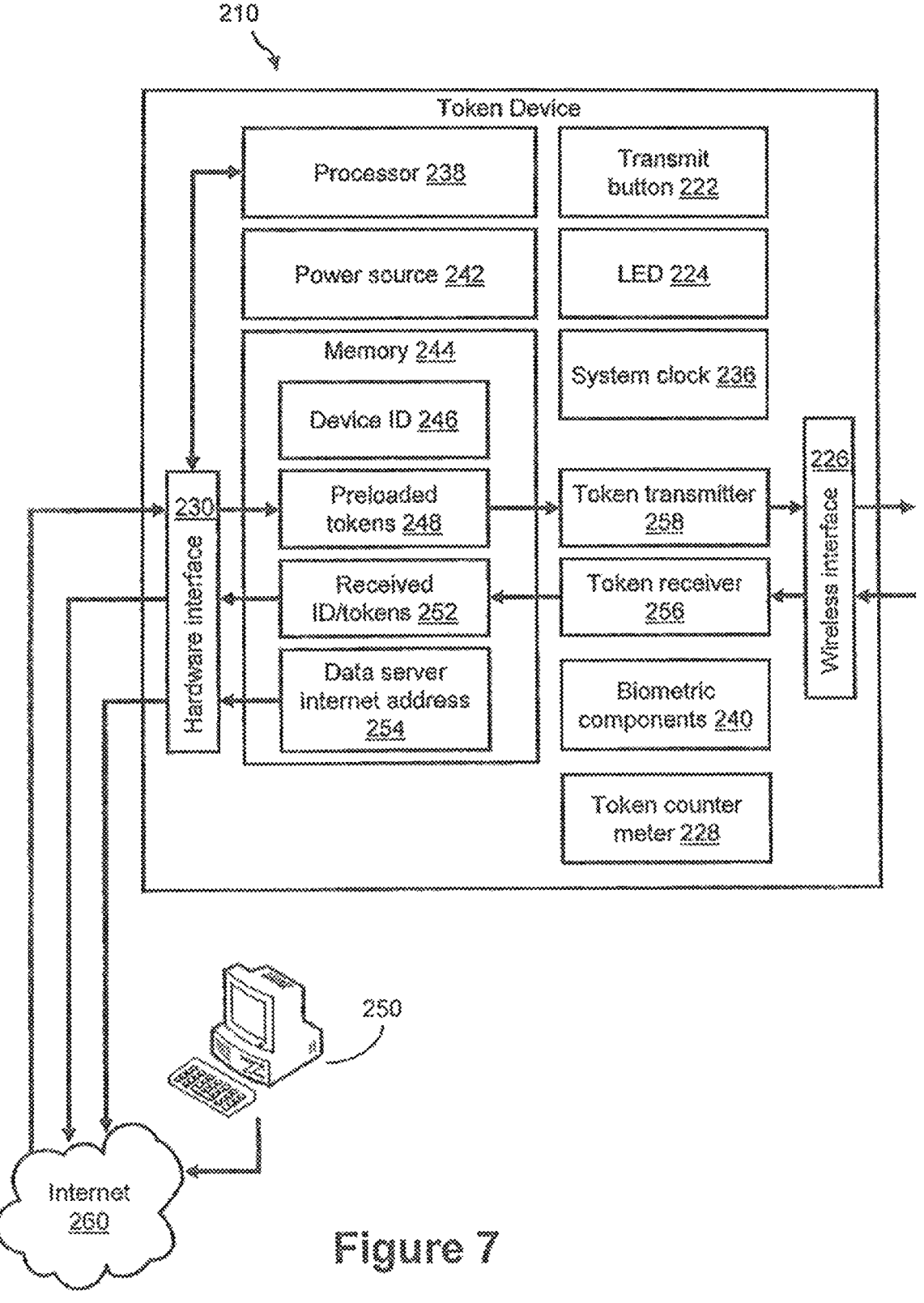
FIG. 7 illustrates a functional block diagram of a portable token device that is coupled to a host device in accordance with one embodiment of the present invention.

FIG. 7 illustrates a functional block diagram of a portable token device, such as token device 210, which is coupled to a host device, such as network computer 250, in accordance with one embodiment of the present invention. FIG. 7 shows that token device 210 may include transmit button 222, LED 224, wireless interface 226, and hardware interface 230, as described in FIG. 6. Additionally, token device 210 may include a system clock 236 for marking received and/or transmitted tokens with a timestamp of the event. Comparing the timestamps of the received and/or transmitted tokens may be used by the system to authenticate and/or verify the networking contact. This may also provide verification within the database that the token was delivered during its allowed token lifetime. It may also be used as means for organizing contacts. In other applications, such in a radio or broadcast environment, wherein a user exchanges tokens with a broadcast device, the time stamp may allow the requestee to vary the reply profile based on the timestamp of the transaction.

The token device can have various other components including, for example, a processor 238, biometric components 240, and a power source 242. Processor 238 may be any controller, microcontroller, or DSP device. Biometric components 240 may include, for example, fingerprinting, a breath analyzer, and/or a retina scanner. The portable token device can be in the form of a USB device, a Smart Card, or other easily portable small embedded device. In general, the portable token device, as opposed to a premises/retailer desk-top token device, may operate without a keyboard, a display screen, or other input/output functionality.

In one embodiment, the biometric element may used to verify the rights of the user to operate the token device. In another embodiment, the biometric element may be used to verify the permission rights of the user to the token service provider or to a third-party for the purposes of conducting a token related transaction.

A memory 244 of token device 210 can include, for example, read-only memory (ROM), Flash memory, and/or random access memory (RAM) in accordance with various embodiments. Memory 244 may include one or more physical memory storage devices and/or memory that is directly associated with a processor circuit, such as a circuit of processor 238. Stored on memory 244 may be, for example, a device ID 246, one or more preloaded tokens 248, one or more received IDs/tokens 252, and a data server internet address 254.

In contrast to many USB devices, the portable token device includes processor 238 for running token device applications on portable token device 210. Processor 238 of token device 210 may be a specialized micro-processor in accordance with one embodiment. Optionally, token device 210 may include a secure processor that runs an operating system or a specialized secure micro-processor that is designed for running a specialized application.

Referring to again FIGS. 6 and 7, token device 210 may include hardware interface 230, which may be, for example, a USB interface, a Smart Card interface, or network interface. Hardware interface 230 may be a wired or wireless interface in accordance with various embodiments. Hardware interface 230 provides I/O functionality between the host device, such as network computer 250, and the portable token device, such as token device 210. Additionally, in some embodiments, power may be provided from the host device to the token device over hardware interface 230. Alternatively, the token device includes an on-board power source, such as power source 242, which may be, for example, a battery or solar cell. Other functionalities not shown in the FIGS. 6 and 7 may include a received token and a to-be transmitted token.

Additionally, the token device 210 that is shown in FIGS. 6 and 7 is exemplary only and not limited to the components and/or functionality shown. For example, in another embodiment, LED 224 and hardware interface 230 (e.g., USB interface) may be optional. In this example, alternative data exchange confirmation is optionally provided and wireless interface 226 may be used to communicate with an external hardware device instead of hardware interface 230.

Furthermore, other example embodiments of token devices are described with reference to FIGS. 9 through 18.

While more sophisticated tokens known in the art may be used in accordance with the principles of the present invention, so-called "dumb" tokens, such as any unique digital string may suffice. As such, a token device for purposes of the invention may include any portable device having computer-readable manufacturer controlled information. Where desired, the token device may include a processor. Alternatively, instead of the token being an entirely unique digital string, the token generator may generate certain tokens that have a portion only of the digital string that is unique. The software for accepting/identifying the transmission may be adjusted accordingly.

Device ID 246 that is stored in memory 244 may be a fixed unique device ID, such as a unique serial number or manufacturer ID or a profile ID within the profile database. As is the case of Ser. No. 11/489,435, the token of these embodiments may be entirely derived from more bits of information. Alternatively, in another embodiment, token device 210 may include a built-in random number generator (not shown) for generating a unique device ID. For example, an algorithm for random number generation may be implemented in processor 238.

The token device may include its own receiver, such as a token receiver 256, and/or transmitter, such as a token transmitter 258. Suitable tokens devices may passively or actively transmit tokens. Rather than preloading tokens, such as preloaded tokens 248, from a server, a token device of the present invention may be programmed to internally generate and store tokens so that a given user may have a queue for to-be transmitted tokens (not shown) and another queue for received tokens, such as received ID/tokens 252. Token devices that are capable of internally generating tokens may include memory having random code, such as a random diversifier, which may be used independently of any manufacturer-controlled data to generate a cryptographic key. The key may alternatively be supplied by the token server or may be capable of being recognized by the token server.

In terms of mobile token exchange between social or business contacts, any appropriate wireless signaling protocols may be used to exchange transaction tokens. However, it is preferred that transaction tokens be exchanged between mutually consenting parties. Alternatively, a consenting sending party transmits his/her token to at least one receiving party that may optionally consent to the token exchange. Infrared transmission may be to a certain extent directionally specific (e.g., between one intended user and another), short range, and can be implemented by any signaling methods known in the art, for example, as those described on the website of the Infrared Data Association. Alternatively, a short range RF signaling protocol may be used to transmit the tokens from one user to another, e.g., Near-Field Communications (NFC) such as those discussed online at the Near Field Communication Forum. NFC is of particular value because the specific communication is established by physical proximity—inches in the case of NFC.

The preferred mode of communication between the devices is a wireless signal sent between one sending and one receiving device. Since the intent is to support one to one personal contact, the design is such as to prevent the exchange of IDs other than to/from the intended physically proximate party. The same or different wireless technology may be used for a reply made by the receiving device to the sending device. However, embodiments of the presented invention are not limited to any specific currently existing or future wireless technologies. Additionally, the communication between the devices is not limited to wireless communication. For example, more details of an example of wired communication between devices is described with reference to FIGS. 9 through 18.

As illustrated in FIG. 2, the token devices, having no display capability, may upload the received tokens to a computer system connected to the network 260. Computer system 290 may be an Internet server computer and may include multiple computers coupled to the Internet for processing information as described herein, for example, and may further include a web application 270 having a user interface that allows users to update their profile, store, classify, and organize their portfolio of profiles. Computer system 290 may provide access to further information about the user of the sending device or other users that are associated with the tokens received from the sending device. Furthermore, computer system 290 may act as a central storage location for user information as well as a clearinghouse and delivery system for messages sent between users.

An additional embodiment of the present invention includes the use of the service and/or hardware for the electronic commerce applications including micropayments. Micropayments are prepaid accounts that may be used for low dollar amount purchases.

The method of the present invention can be adapted for secure data retrieval system in a business context using non-secure tokens wherein one of the registered users is a business premises, event organizer or health-care provider having a display-capable stationary transaction token device, said stationary token device capable of real time download and display of profile associated with received transaction tokens and wherein business data associated with owner of said profile may be securely accessed to facilitate a business transaction.

Figure 8:
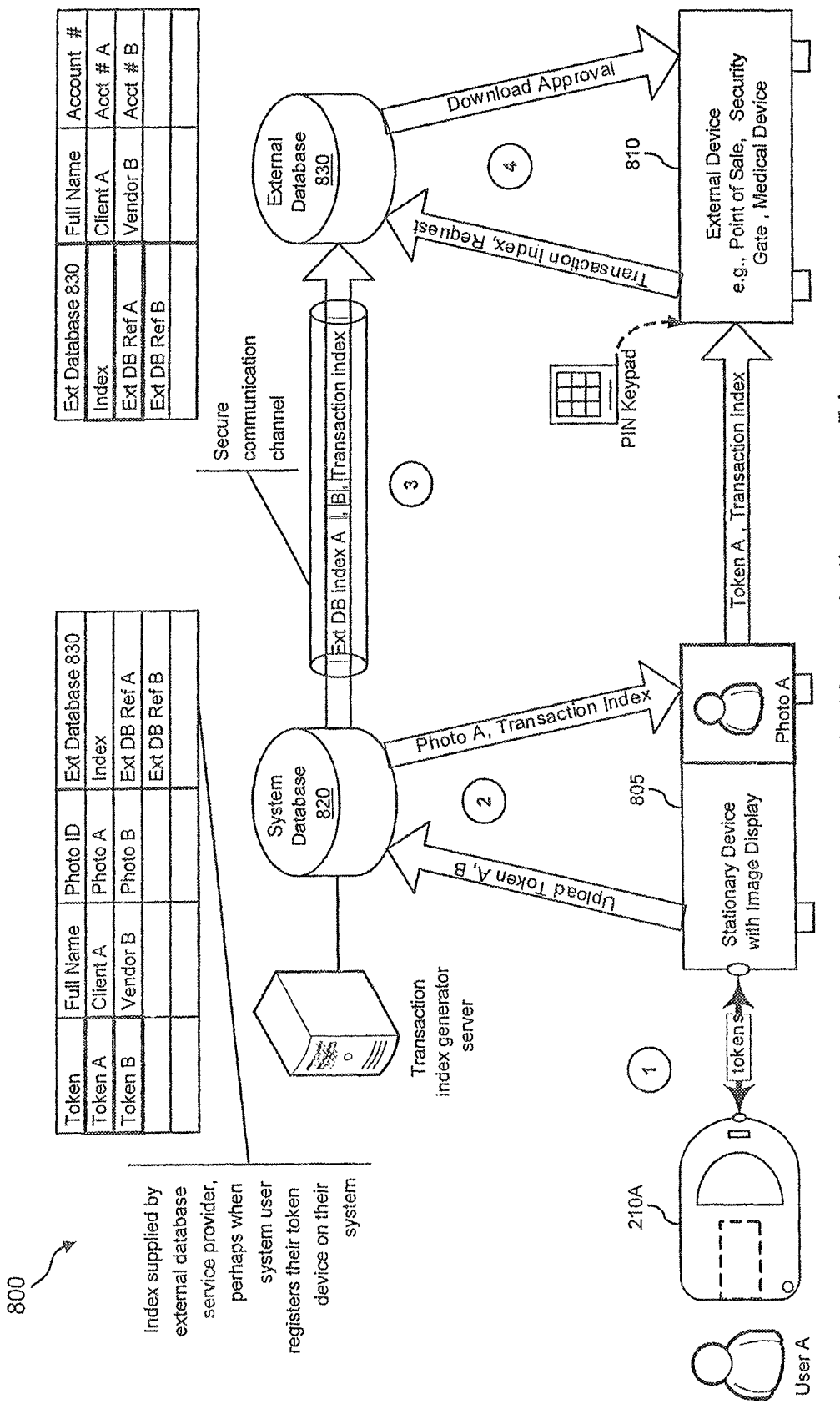
FIG. 8 illustrates a functional block diagram of a secure data retrieval system that uses non-secure tokens in accordance with one embodiment of the present invention.

FIG. 8 illustrates a functional block diagram of a secure data retrieval system 800 that uses non-secure tokens in accordance with one embodiment of the present invention. By way of example, secure data retrieval system 800 may include medical applications where a user profile may contain medical or other information that may be accessed by a doctor, pharmacist, emergency services technician or other health provider. User A, an individual and a business client or invitee having a portable transaction token device 210A exchanges token with a stationary transaction token device 805 situated in a hospital or business premises. The stationary token device 805 requests User A's profile from a system database 820 using the token received from User A. User A's profile downloaded into the stationary token device 805 may include User A's picture, e.g., photo A. Upon verification that the token is associated with a user that has an account in the other party's system, that verification code can be fed, for example, to an external device 810 (e.g., point of sale, security gate, medical device, etc) of the vendor along with perhaps the account code and the client's official picture in order to retrieve their business or medical records from the vendor's database, such as an external database 830. In that way, a system more secure than the typical credit card has been created because there is no credit card number in circulation (given that tokens are single use) and the vendor received picture verification that the token belonged to the holder. The retrieval of a user picture verified by a trusted authentication service, e.g., a government office or a bank, based on the submission of a token according to these methods, creates a multitude of secure access applications similar to the premise purchase application described here.

Referring again to FIG. 8, one benefit of the index of the external database 830 may be in enabling e-commerce. For example, one method of enabling e-commerce with the token devices is to have the user enter their credit card information into their profile. Then whenever a user uses his/her token device at a payment station (e.g., a point of sale (POS) device), the station submits the payment amount along with the tokens for authentication and processing. In this environment, the service provider must securely store all of the associated financial account information. The index of the external database 830 of secure data retrieval system 800 is suitable for this purpose.

In one example, the service provider may store a reference only to the user's bank account on the external database 830. Then over the secure channel they inform the associated vendor which of their clients is making the request. One advantage of the architecture may be that these indexes may be updated as often as the vendor wants, and are of no use outside of the secure channel between the service provider and external database 830. In turn the account numbers are also protected, because they never need to be revealed publically in order to conduct a transaction and, thus, are protected from being stolen and used in an unauthorized fashion. Another privacy benefit of the index of the external database 830 is that every bank/vendor may have their own reference index within the system, without relying on, for example, a social security number to keep the information aligned.

Yet another embodiment of the present invention includes software, which can be downloaded into an existing platform to enable it to practice the present invention and perform in the techniques described herein.

Embodiments of the present invention may also include business methods for generating revenue and income through the sales of hardware, software and services using the techniques described herein. These include, but are not limited to, (a) selling software for use on existing hardware platforms to enable the invention, (b) the sale of hardware (including jewelry or other form factors described below) to enable the invention, (c) charging users on an annual, monthly or per-message basis for use of the services described herein, and (d) a third party receiving links, advertorial content, or other business value in exchange for sponsoring mobile token devices or associated profile services for users. These business methods also include the ability to charge or incentivizing users for the exchange of messages or information processed through one or many central servers based on tokens exchanged between mobile devices and then uploaded as described above. It is to be understood that a variety of users (i.e., senders, recipients, or both) may benefit from various applications of the present invention. Users of the devices and services may include individuals, businesses, not-for-profit organizations, advertisers, political action groups, or any other organization.

In a preferred embodiment, the token device is ruggedized by any means known in the art so that it can withstand the jostle and tumble of everyday life. The wireless token device of this invention is preferably a portable stand alone device having no display capabilities preferably weighs less than one ounce. It may be embedded in a watch, a cell-phone, a broach, a pendant, a necklace, a ring, an earring, an article of clothing, a clothing label, a wallet or a key-chain.

In another embodiment, the hardware interface of the device may have a retractable, foldable, or otherwise physically protected male USB interface, such that the device can quickly interface to a computer. The USB interface shall be discrete and protected when not in use. Also, in one embodiment, the wireless interface of the device may have an IR/RF emitter for sending and receiving short bursts of data to/from a sister device. In a preferred embodiment, the transmitter may use data-transmission protocols that are suitable for successful delivery of 512 bits of data. The device shall have a single button to activate the IR/RF send/receive function and the exchange of wireless identifications shall be accomplished by single button exchanges so that the flavor of the moment is not diluted by multiple clicks and button exchanges. When pressed, the emitter shall transmit a single token. It may be that if the transmit button is held down longer than, for example, about 15 seconds it will need to be released and re-pressed for the device to begin the cycle again. It is to be understood that longer or shorter transmission times are part of the invention. In the stationary embodiment, the device may be set to always receive via an on/off switch.

While the device is transmitting data using the IR/RF interface the LED(s) may use a signal pattern (e.g., blinking) to indicate to the user the device's activity. When the RF receiver successfully receives data from another device the LED may show an alternate signal pattern (e.g., solid for 2 seconds) to indicate the reception. Also, devices shall have an internal processor to control the interaction of the various electronic components, including, but not limited to, the inter-device signaling protocol (IR or otherwise), error checking to prevent multiple copies of the same data being written successively, the LED signal pattern, the USB upload protocol, the initial process of linking the device to the data server and assigning or registering it's unique ID, and the initiation process of the device to upload the particular users profile to the data server.

FIGS. 9 through 18 below describe additional embodiments of token devices and systems of the present invention.

Figure 9:
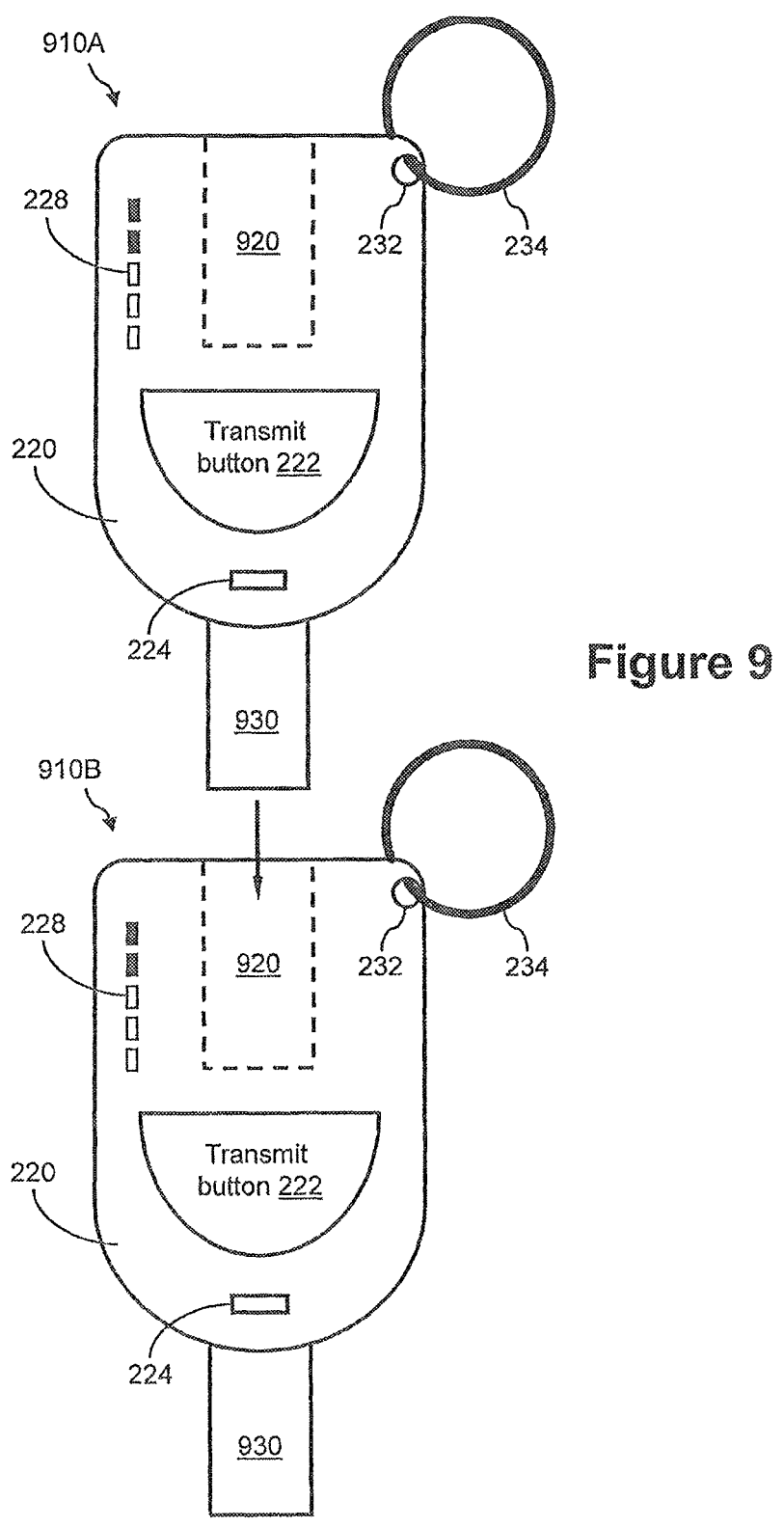
FIG. 9 illustrates a top view of a pair of portable token devices that are communicating in a wired fashion, in accordance with one embodiment of the present invention.

FIG. 9 illustrates a top view of a pair of portable token devices 910 that are communicating in a wired fashion, in accordance with one embodiment of the present invention. Portable token devices 910, such as token device 910A and 910B, are substantially the same as portable token devices 910 that are described in FIGS. 2 through 7 except that a wired communication means for communication between portable token devices 910 is provided in place of or along side of, for example, wireless interface 226 (e.g., an IR/RF emitter). In this embodiment, each token device 910 includes a female USB connector 920 and a male USB connector 930. Therefore, the exchange of tokens may be facilitated in a wired fashion by directly coupling the male USB connector 930 of one token device 910 (e.g., token device 910A) to the female USB connector 920 of another token device 910 (e.g., token device 910B), as shown in FIG. 9, and pressing the transmit button 222. Optionally, a removable cap (not shown) may be provided for protecting male USB connector 930 when not in use.

Portable token devices 910 are not limited to the use of USB connectors for providing the wired communications, as shown in FIG. 9. Any convenient mechanism for providing a direct electrical connection between two token devices is suitable. For example, two or more flat contact pads (e.g., spring-loaded contacts) may be provided on the housing of each token device, where the contact pads of one token device may be held against the contact pads of another token device by the users thereof. In this example, a simple alignment mechanism may be provided to assist contact.

Figure 10:
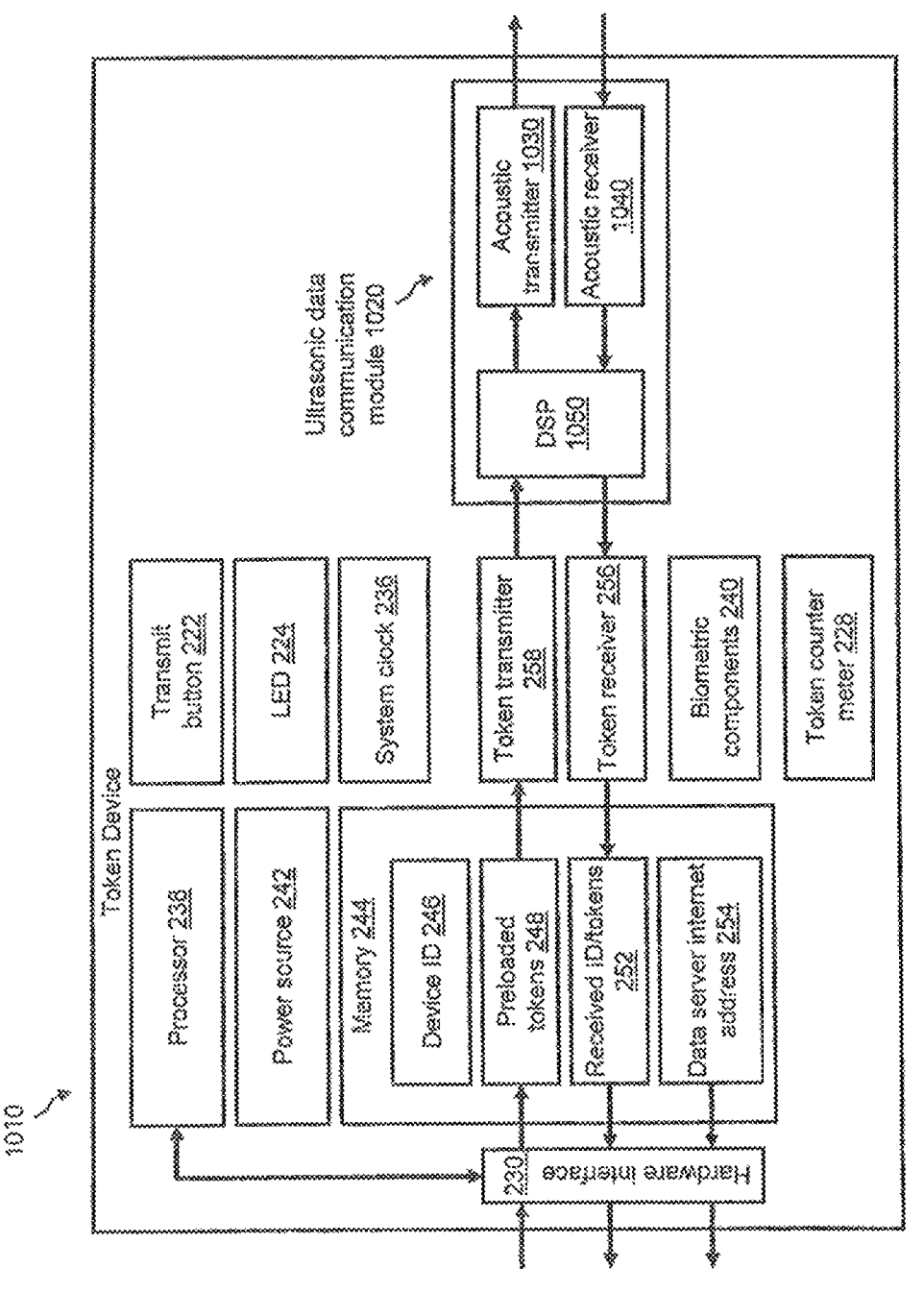
FIG. 10 illustrates a functional block diagram of a portable token device that includes ultrasonic communication capability, in accordance with one embodiment of the present invention.

FIG. 10 illustrates a functional block diagram of a portable token device 1010 that includes ultrasonic communication capability, in accordance with one embodiment of the present invention. In this embodiment, portable token device 1010 is substantially the same as portable token device 210 of FIGS. 2 through 7 except that an ultrasonic data communication module 1020 may replace or operate along side of wireless interface 226, in order to provide a portable token device that uses ultrasonic data as the wireless data transfer mechanism.

Ultrasonic data communication module 1020 may include any suitable components for transmitting/receiving acoustic waves, such as transducers for converting electronic data to pulsed ultrasonic data and vice versa. In one example, FIG. 10 shows that ultrasonic data communication module 1020 may include an acoustic transmitter 1030 and an acoustic receiver 1040, both of which may be transducer devices. The data transmitted and received by acoustic transmitter 1030 and acoustic receiver 1040, respectively, may be processed by, for example, a digital signal processor (DSP) 1050. An example of technology that is suitable for use in ultrasonic data communication module 1020 is found in reference to U.S. Pat. No. 5,982,297, entitled "Ultrasonic data communication system," assigned to The Aerospace Corporation (El Segundo, Calif.). The '297 patent describes a system that includes a first transducer and a second transducer that are coupled together through a coupling medium that communicates input and output undulating pressure waves between the first and second transducers. In this way, input and output data is transferred between an external controller and an embedded sensory and actuating unit. The external controller provides input data signals that energize the first transducer and the embedded unit that provide output data signals that energize the second transducer collectively for bidirectional communication of data between the controller and embedded unit for functional sensor and actuator process control. The system of the '297 patent provides bidirectional transfer of data through a coupling medium without the use of electrical power wires for controlling embedded sensors and actuators.

Referring again to FIG. 10, in the token exchange operation, pulsed ultrasonic data is transmitted/received by use of ultrasonic data communication module 1020 within the token device in order to provide wireless bidirectional data transfer. In this embodiment, the use of the token device is to some extent directional, meaning the user of the token device must point his/her token device in at least the general direction of another token device of interest.

In another embodiment, the portable token device of the invention may include wireless broadband technology, such as Wi-Fi technology, IEEE 802.11 technology, ZigBee® technology, and/or Bluetooth® technology, that enables wireless communication via, for example, a wireless WAN and/or LAN. The inclusion of broadband technology in the portable token device allows for device-to-device and/or device-to-networked computer communication, an example of which is shown in FIG. 11.

Figure 11:
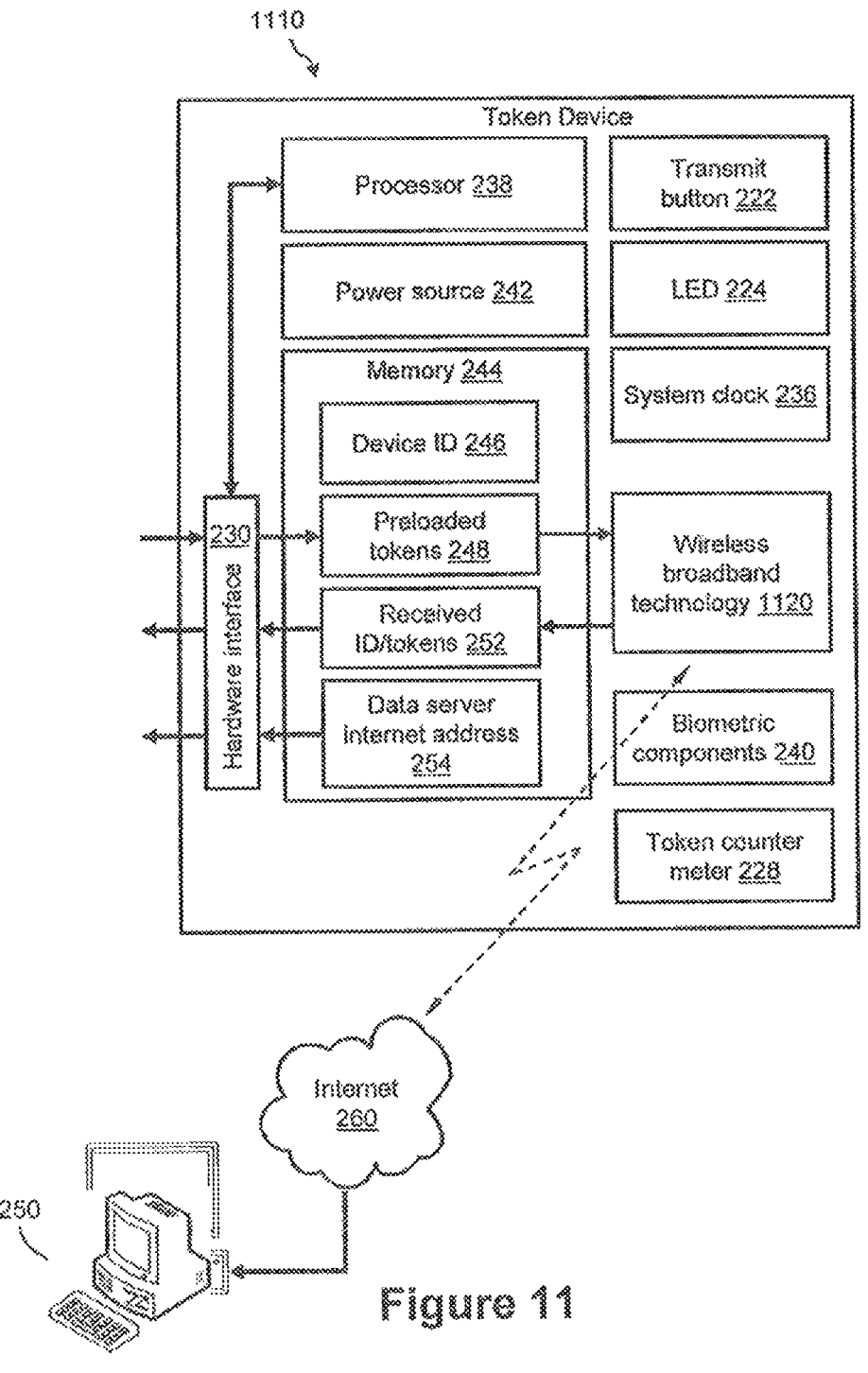
FIG. 11 illustrates a functional block diagram of a portable token device that includes wireless broadband communication capability, in accordance with one embodiment of the present invention.

FIG. 11 illustrates a functional block diagram of a portable token device 1110 that includes wireless broadband communication capability, in accordance with one embodiment of the present invention. In this embodiment, portable token device 1110 is substantially the same as portable token device 210 of FIGS. 2 through 7 except that wireless broadband technology 1120 may replace or operate along side of token receiver 256, token transmitter 258, and wireless interface 226.

In the case where there is a party line or broadcast or medium/meeting room wherein two or more users wish to exchange tokens with each other (e.g., a one-way or two-way exchange). The devices may be put into a discovery mode to identify all of the other token devices in the space or communications channel, before beginning token transactions with each of the discovered devices. Such bounded discovery operation may be controlled based on signaling range, a select channel, a shared secret, a user selection interface or other means to prevent unauthorized persons from participating in the group token exchange. In a physical meeting space, this token method avoids the archaic business card exchange ritual at new meetings.

Because wireless broadband technology 1120 may allow a certain token device to discover multiple other token devices that may be also within the range of a wireless broadband network, an additional operation may be required to establish a one-to-one connection. That is, another level of functionality and/or navigation may be required. For example, the token device may be equipped with a small display and/or keypad. In one example, once a certain device queries the wireless broadband network and discovers multiple token devices, a set of pictures of all the discovered users may be displayed. The user of the certain token device may then scroll through the user pictures and select one or more users of interest with whom to exchange tokens.

Another method of communicating with one of several users that have been discovered may be by transmitting a mutually known code between at least two consenting parties. Upon the two or more token devices detecting matching codes, the at least two consenting parties may perform a one-to-one exchange of tokens. Any of various methods of generating a code may be utilized. In one example, the sender presses a certain number sequence on a keypad of his/her token device, which is transmitted over the wireless broadband network. Alternatively, the sender presses a certain key (e.g., transmit button 222) multiple times with a certain sequence of short and long pulses, like Morse code. All devices within range of the network may receive the code. However, the code is known to a certain one or more intended receivers only who must act to enter the same sequence, perhaps within a certain limited timeframe (e.g., within 1 minute of receiving the code), using their token device. If the codes that are entered by both the sender and the one or more intended receivers match, tokens may be exchanged. However, if the codes that are entered by both the sender and the one or more intended receivers do not match, tokens may not be exchanged. The longer the sequence in the code, the more authentication is provided, and the more secure the transaction.

Figure 12:
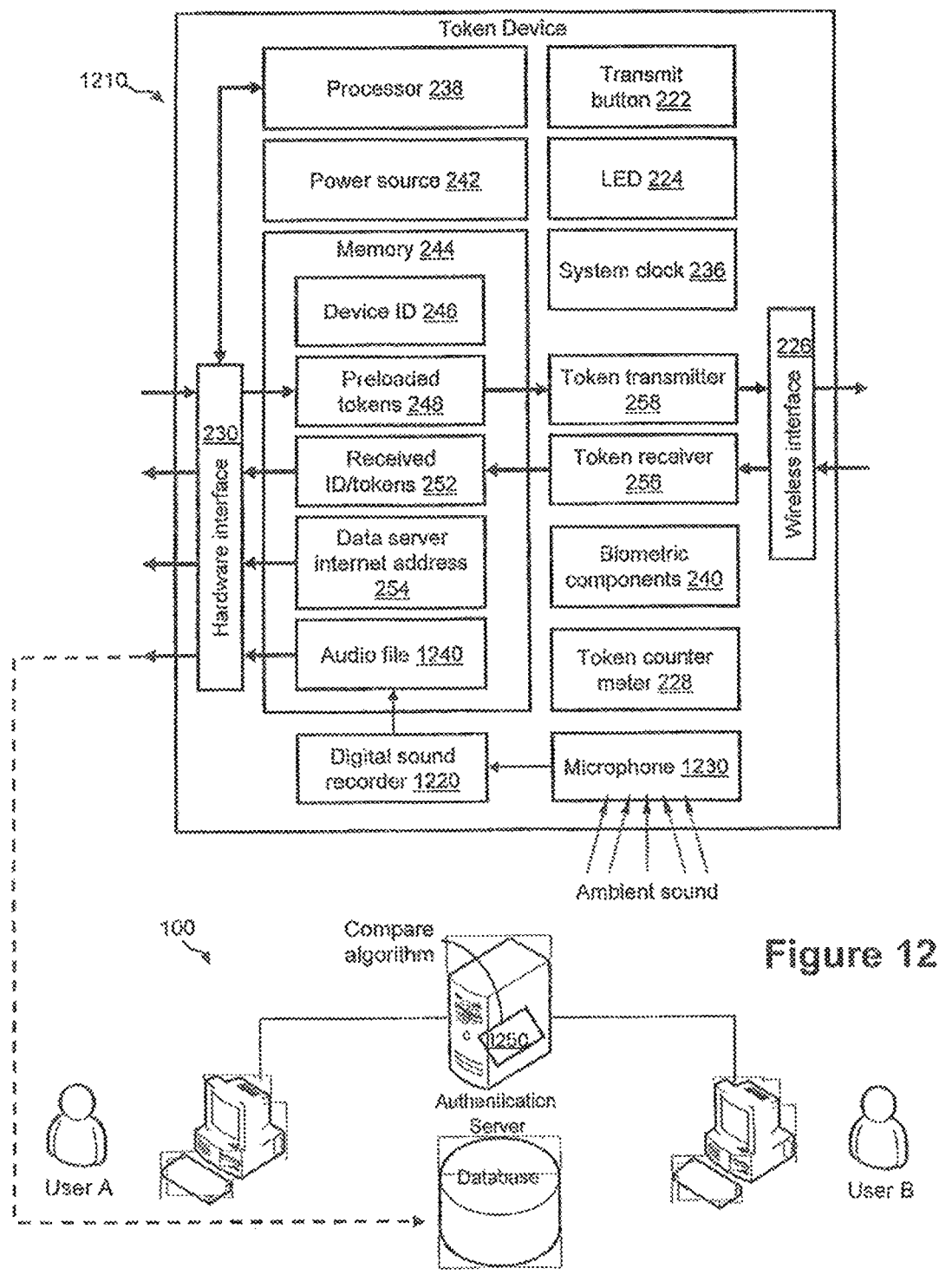
FIG. 12 illustrates a functional block diagram of a portable token device that includes sound recording capability, in accordance with one embodiment of the present invention.

FIG. 12 illustrates a functional block diagram of a portable token device 1210 that includes sound recording capability, in accordance with one embodiment of the present invention. In this embodiment, portable token device 1210 is substantially the same as portable token device 210 of FIGS. 2 through 7 except that it further includes a digital sound recorder 1220, a microphone 1230 (e.g., a built-in or external microphone), and an audio file 1240 that is generated by digital sound recorder 1220 and stored at memory 244.

By use of microphone 1230 and digital sound recorder 1220, ambient sound in the physical environment of token device 1210 may be captured and stored in audio file 1240. Alternatively, the user's voice may be captured and stored. In either case, the captured audio may be used as a non-spoofable unique identifier and, thus, provides an additional means for a unique security or authentication layer.

FIG. 12 also shows a portion of computing environment 100 of FIG. 1 and in one example, User A and User B, who are in substantially the same physical location, press a record button (not shown) on respective portable token devices 1210 and, thereby, capture a certain amount of substantially the same ambient audio content, which is saved in respective audio files 1240. During the authentication operation that is described, for example, in FIG. 1, the digital audio data from each device may be compared. This comparison may be performed on the sender's and/or receiver's local portable token device 1210 via, for example, processor 238. Alternatively, the sound comparison may be performed at the authentication server via, for example, a compare algorithm 1250. Compare algorithm 1250 may be any standard audio compare algorithm, such as one the compares certain frequencies. In this case, the audio files 1240 are passed up to the authentication server database for processing by compare algorithm 1250. Each audio file 1240 may contain a small packet of data (e.g., up to about 64 k bytes of data). In one example, multiple filters (not shown) may be provided by which compare algorithm 1250 may sample the amplitude of sound at certain frequencies (1 khz, 5 khz, 10 khz, 15 khz) as a rapid comparison.

In the case of local authentication, if the audio that is captured on both the sender's (e.g., User A) and receiver's (e.g., User B) local portable token device 1210 substantially matches, a one-to-one token exchange between devices is allowed. In this example, the ability to capture ambient sound gives context to the exchange process.

Furthermore, the inclusion of a digital sound recorder, such as digital sound recorder 1220, may provide additional usefulness. For example, the digital sound recorder may allow a user to capture a voice recording of specific comments or notes that the sender and/or recipient may want to recall.

In yet another embodiment, the principles of recording sound that are described in FIG. 12 may likewise apply to recording ambient light. For example, each portable token device may include an optical sensor, such as a photocell device, in order to capture the local ambient light, the intensity of which may be digitized and saved in memory. Again, the ambient light data may be compared and utilized in much the same way that the audio data is compared and utilized. Furthermore, a combination of both sound and light may be used.

Figure 13:
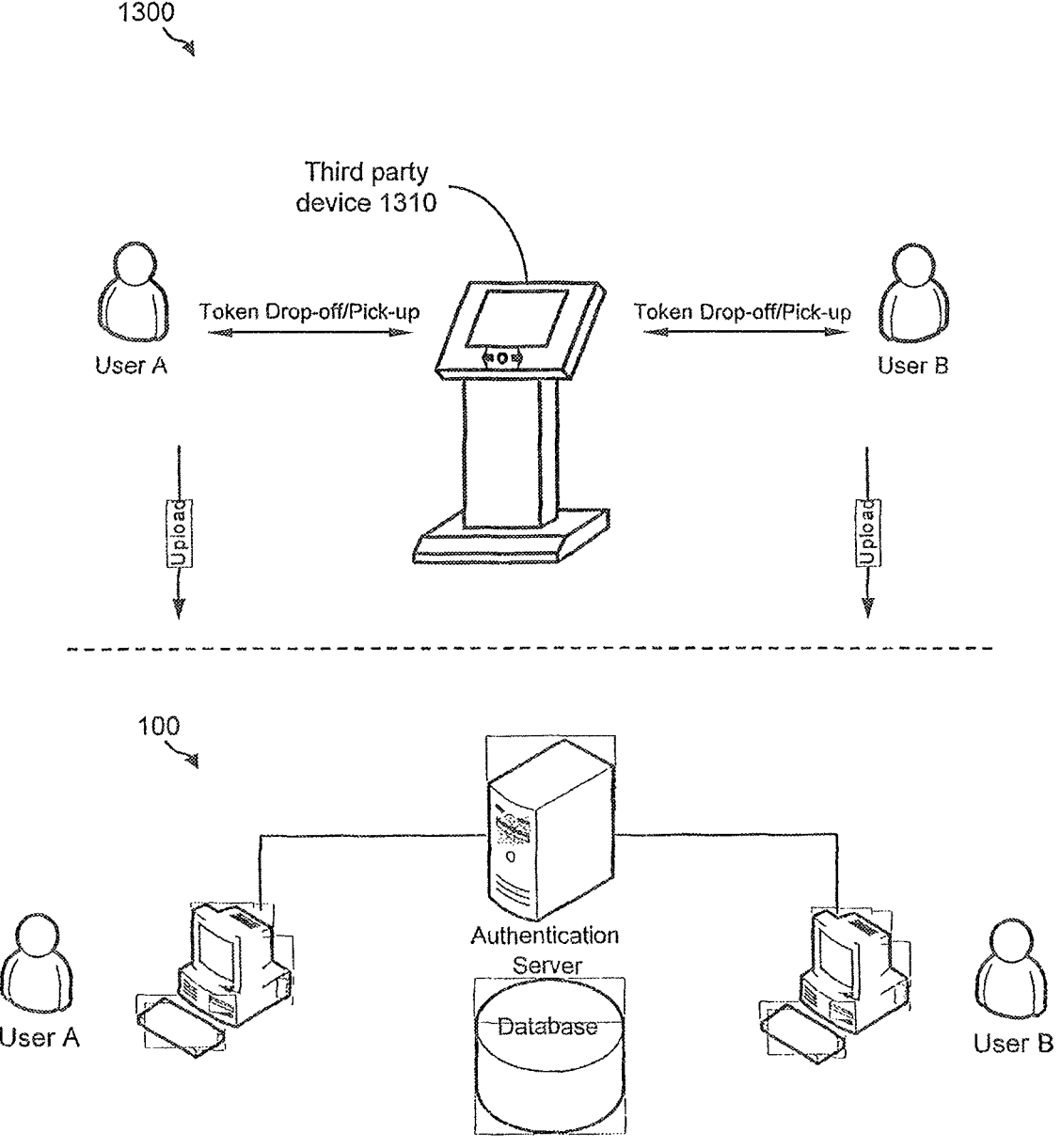
FIG. 13 illustrates a functional block diagram of a token exchange environment, which includes a third party device that may serve as an intermediary device for the exchange of information between two or more user-subscribers.

FIG. 13 illustrates a functional block diagram of a token exchange environment 1300, which includes a third party device that may serve as an intermediary device for the exchange of information between two or more user-subscribers. FIG. 13 also shows token exchange environment 1300 in combination with a portion of computing environment 100 of FIG. 1. In this embodiment, the token exchange environment 1300 includes a third party device 1310 that may be, for example, a standalone device, such as a standalone kiosk. By use of third party device 1310 any user-subscriber may "drop-off" his/her token information at third party device 1310 where it may be temporarily and securely stored until such time that another intended user-subscriber may "pick-up" the token information. Data may be transmitted between any user's token device and third party device 1310 via, for example, wireless transmission (e.g., IR and RF) or wired transmission (e.g., USB connection). In one example and referring to FIG. 13, User A drops-off his/her token information at a third party device 1310. At some time later, User B may pick-up User A's token information and/or drop-off his/her token information in return for later pick-up by User A. By use of third party device 1310, a face-to-face interaction between two or more users, such as User A and User B, is not required. Once a token exchange has occurred via third party device 1310 the authentication and use of the token information may be as described, for example, in computing environment 100 of FIG. 1.

The information from the user that drops-off his/her information at third party device 1310 may be tagged (e.g., with certain authorization criteria) in such a way as to allow an intended user only to pick up the information at third party device 1310. Additionally, there may be a time limit (e.g., within 10 minutes of drop-off) within which the intended receiving user must pick-up the sending user's information. Optionally, once an exchange transaction has occurred via third party device 1310, a paper receipt may be printed for the receiving user. Additionally, User A, for example, may return to third party device 1310 and verify whether User B has picked up his/her token.

In another embodiment of the invention, the third party device 1310 of FIG. 13 may be a third user, such as a User C, who passes data between Users A and B.

Figure 14:
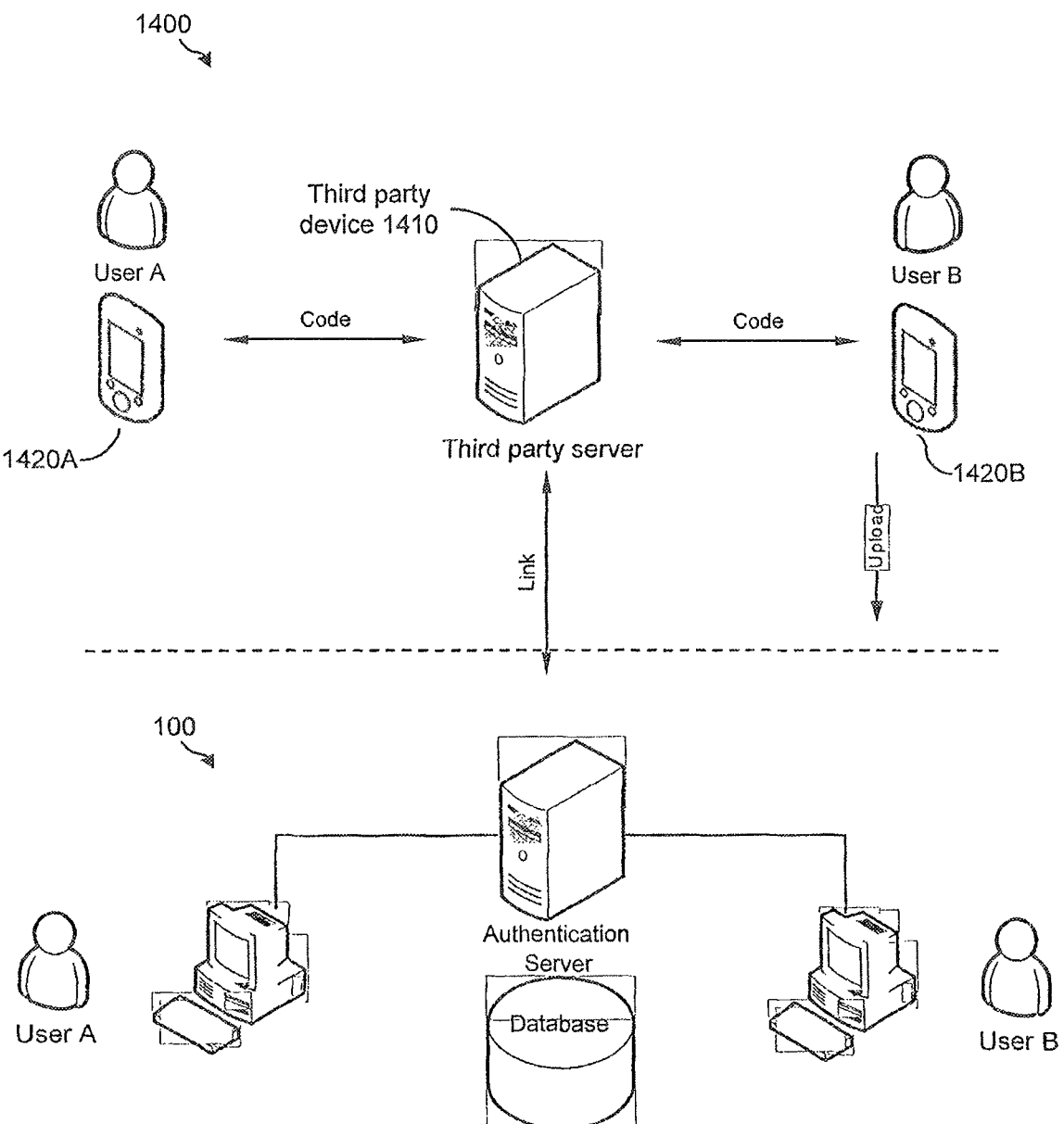
FIG. 14 illustrates a functional block diagram of a token exchange environment, which includes another third party device that may serve as an intermediary device for the exchange of information between two or more user-subscribers.

FIG. 14 illustrates a functional block diagram of a token exchange environment 1400, which includes another third party device that may serve as an intermediary device for the exchange of information between two or more user-subscribers. FIG. 14 also shows token exchange environment 1400 in combination with a portion of computing environment 100 of FIG. 1. In this embodiment, the token exchange environment 1400 includes a third party device 1410 that may be, for example, a third party service provider that may serve as an intermediary device for the exchange of information between two or more user-subscribers. Examples of third party service providers may include, but are not limited to, cell phone service providers, email service providers, and/or Global Positioning System (GPS) service providers.

By use of third party device 1410, which may be a third party service provider, any user-subscriber may approve the exchange of information with another user-subscriber by contacting third party service provider who then authenticates the exchange operation. In this example, the portable token device may be a device that has enhanced functionality, such as, but not limited to, sound recording capability, email capability, TXT messaging capability, and/or GPS capability. By way of example, FIG. 14 shows User A that has a token device 1420A and User B that has a token device 1420B, where token devices 1420A and 1420B may be, for example, a cell phone, PDA device, and/or GPS device.

In one example and referring to FIG. 14, User A and User B wish to exchange information. Both User A and User B may transmit a mutually agreed upon code (e.g., via email or TXT message) using his/her token device 1420A to the third party service provider. The code may be used by the third party service provider in order to authenticate that there is intended transmittal of information between the users. The code may contain certain authorization criteria, such as substantially matching (i.e., within practical limits) ambient sound data, timestamp data, GPS data, and/or ambient RF data (e.g., identifying proximate cellular towers or other wireless devices). The code may also contain one or both of the device network ID's (e.g., IP, MAC, or SMS address such that the devices are able to upload or receive the token ID's over a communication link that is already authenticated through the Third Party Server to the Authentication server. Once the third party service provider has verified the relationship between the codes (e.g., valid, matching, or sequenced, etc), the authentication to exchange profile information may be as described, for example, in computing environment 100 of FIG. 1.

Figure 15:
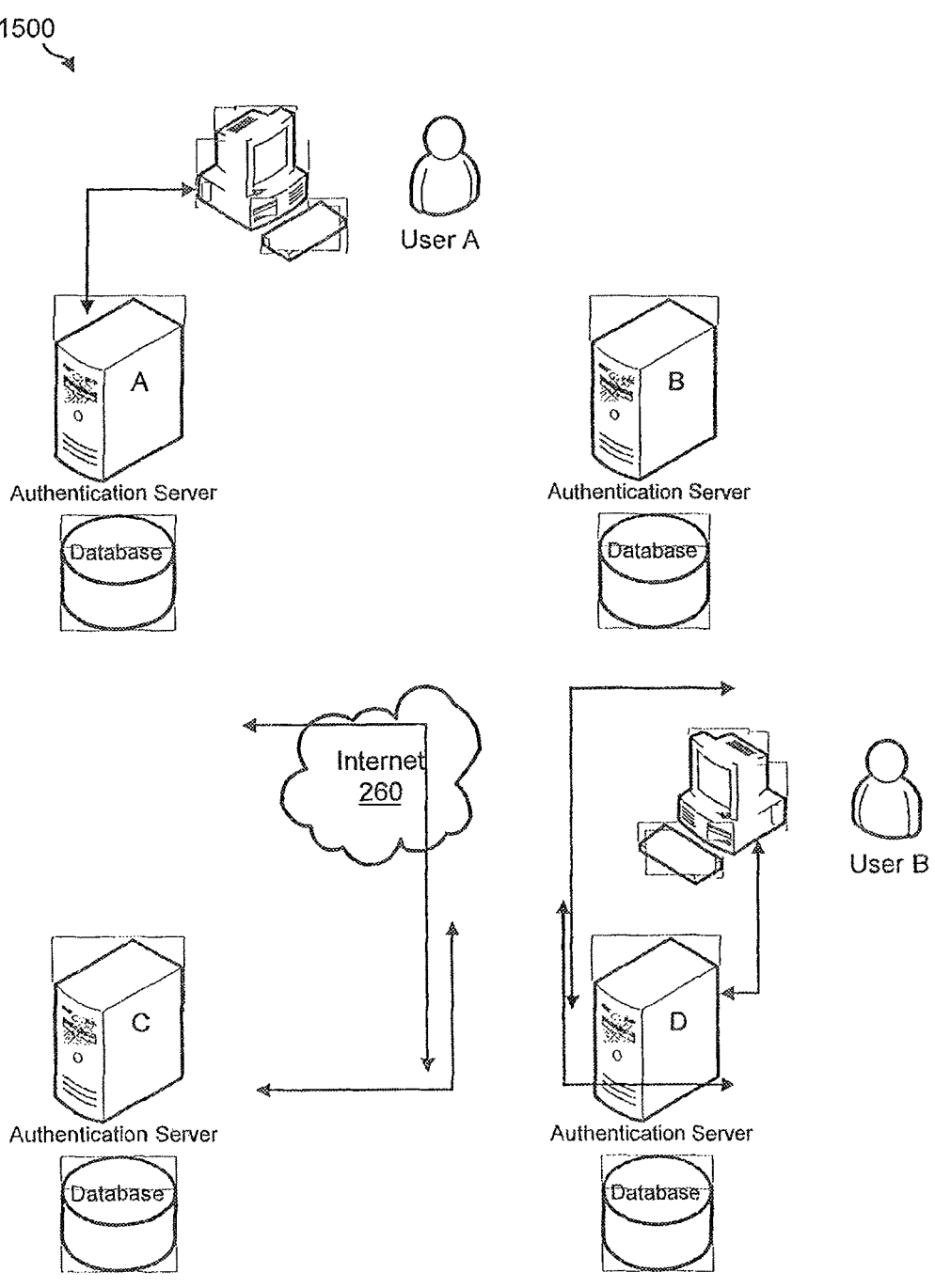
FIG. 15 illustrates a functional block diagram of a computing environment that includes a plurality of service providers, rather than one service provider only.

FIG. 15 illustrates a functional block diagram of a computing environment 1500 that includes a plurality of service providers, rather than one service provider only. In this embodiment, computing environment 1500 may include multiple instances of the service provider that is described with reference to FIGS. 1 through 5. More specifically, computing environment 1500 shows a plurality of service providers that are represented by, for example, authentication servers A, B, C, and D. Each authentication server is substantially the same as the authentication server that is describe with reference to FIGS. 1 through 5. By way of example, User A is associated with authentication server A and gains access to the service via authentication server A's website (not shown). By contrast, User B is associated with authentication server D and gains access to the service via authentication server D's website (not shown). Because the authentication servers of the participating service providers may communicate one to another via, for example, the Internet 260, User A and User B may contact one another even though each is using a different service provider.

Figure 16:
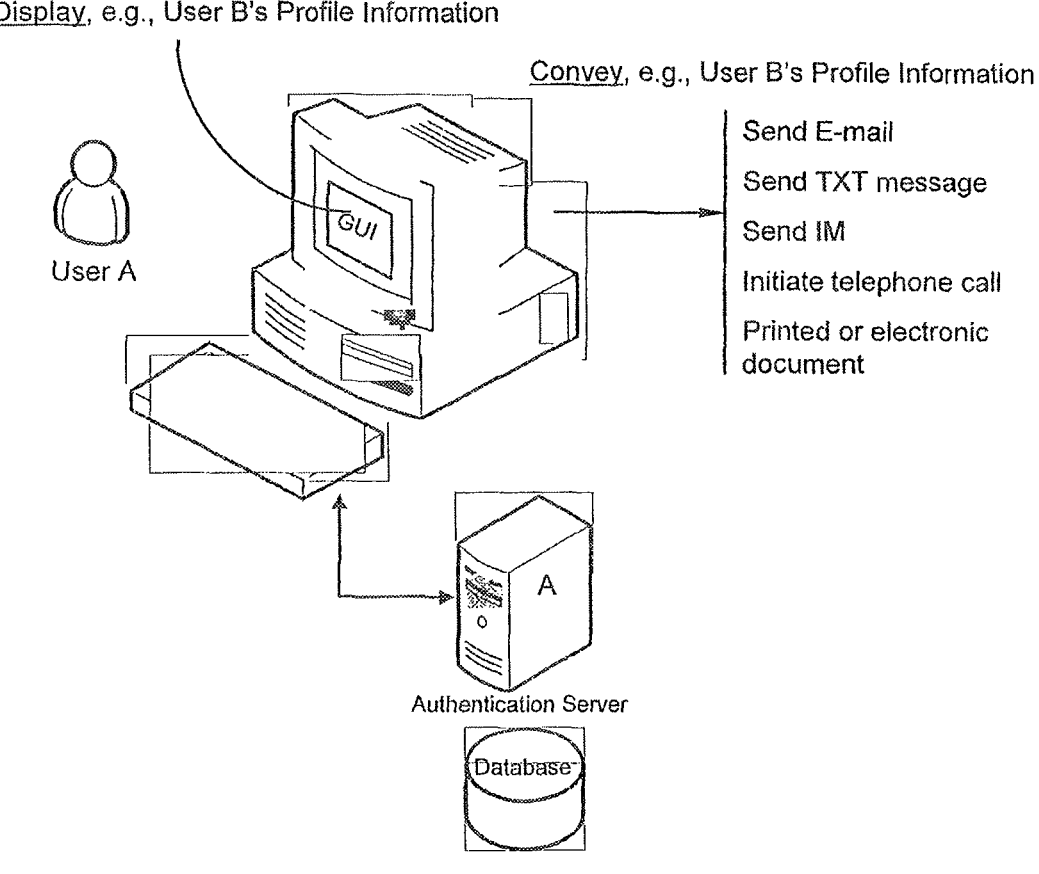
FIG. 16 illustrates a process of conveying the profile information that is associated with a transaction token, rather than displaying the profile information only.

FIG. 16 illustrates a process 1600 of conveying the profile information that is associated with a transaction token, rather than displaying the profile information only. In this embodiment, once the profile information of the requestee is received by the requesting user, this information may be displayed on the requesting user's computer and/or conveyed for some other purpose. For example, FIG. 16 shows User A receiving User B's profile information. User B's profile information may be displayed on User A's computer. Alternatively, User B's profile information may conveyed to some other user and/or entity via, for example, but not limited to, an email (e.g., initiating an email to User A), a TXT message (e.g., initiating an TXT message to User A), an instant message (e.g., initiating a chat session to User A), a telephone call (e.g., automatically dialing the phone number of User A), a printed or electronic document (e.g., filling in postal information of User A), and so on. A software application and/or algorithm (not shown) for this function may reside on the user's local computer or on a network computer to which the user is connected.

Referring again to FIG. 16, other information that may be conveyed may be information about a transaction itself, such as sending a digital copy of a purchase receipt.

Figure 17:
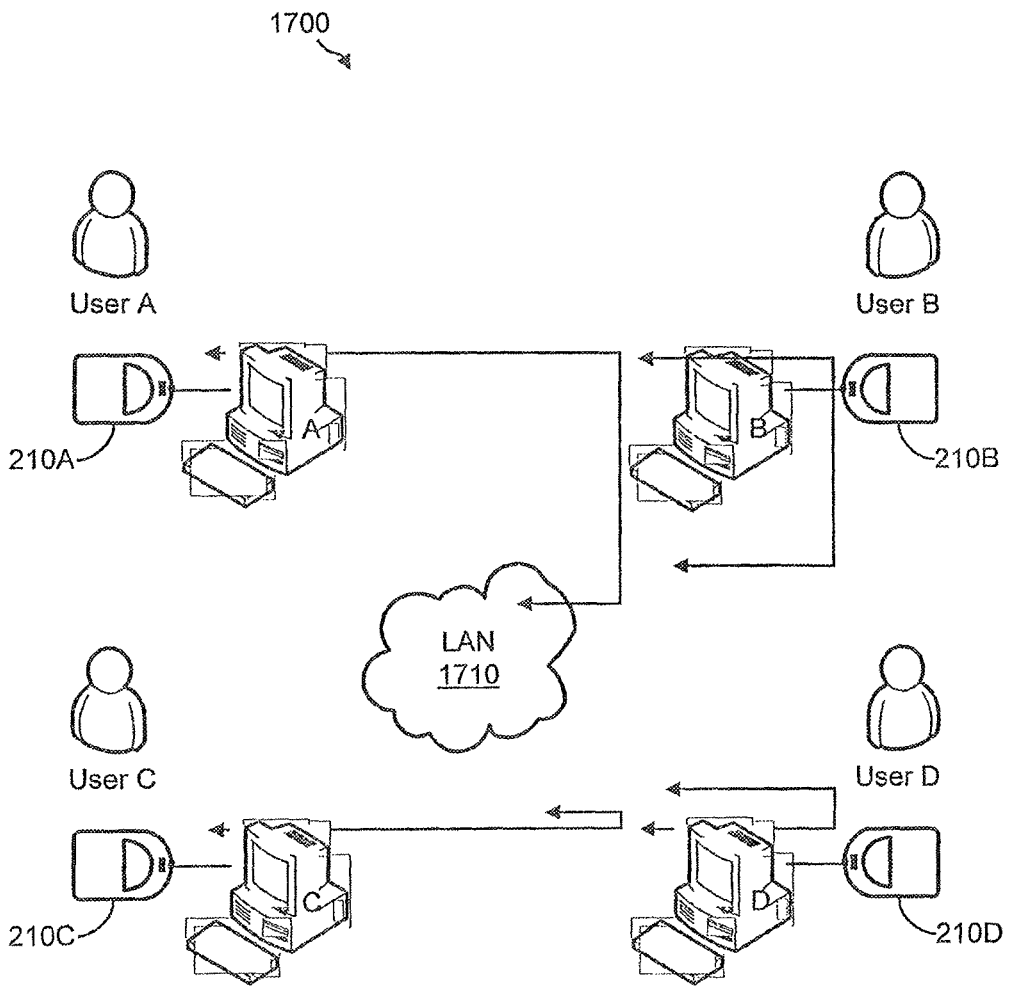
FIG. 17 illustrates a functional block diagram of a computing environment that includes token devices that are associated with a computer network address, rather than with a user profile.

FIG. 17 illustrates a functional block diagram of a computing environment 1700 that includes token devices that are associated with a computer network address, rather than with a user profile. Computing environment 1700 may include a LAN 1710, which is a local network that may connect multiple computers, such as computers A, B, C, and D. Computers A, B, C, and D may be associated with Users A, B, C, and D, respectively, and token devices 210A, 210B, 210C, and 210D, respectively. In this embodiment, when a user connects his/her token device into his/her computer via, for example, a USB connection, the device ID of token device is associated with the hardware address (e.g., Media Access Control (MAC) address, Internet Protocol (IP) address, Ethernet Hardware Address (EHA), etc.) of the certain computers. For example, when User A connects token device 210A into computer A, the device ID of token device 210A is associated with the hardware address or computer A; when User B connects token device 210B into computer B, the device ID of token device 210B is associated with the hardware address or computer B; when User C connects token device 210C into computer C, the device ID of token device 210C is associated with the hardware address or computer C; and when User D connects token device 210D into computer D, the device ID of token device 210D is associated with the hardware address or computer D.

The embodiment shown in FIG. 17 may enable peer-to-peer chatting following an exchange of tokens as long as the token devices are connected to the user's respective computers, without the need to provide access to profile information that may be stored by the service provider. In other words, computing environment 1700 allows communication between users without exchanging profile information. Alternatively, peer-to-peer communication may be provided by use of any chat application (e.g., AOL, Yahoo, MSN, and Skype). An advantage of this embodiment may be that any entity that is connected to LAN 1710 may be considered a "trusted" entity.

Figure 18:
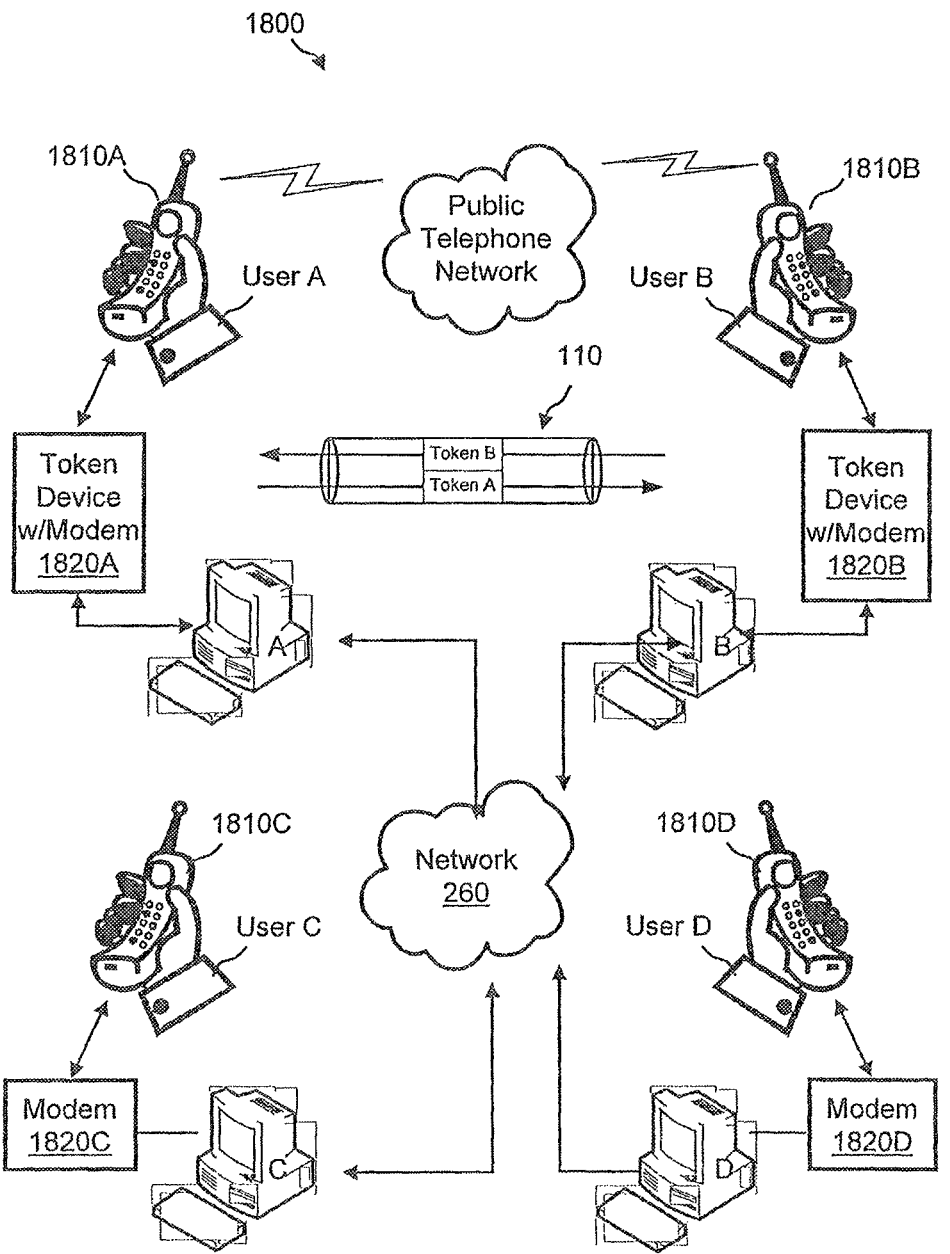
FIG. 18 illustrates a functional block diagram of a telephone-based token system.

FIG. 18 illustrates a functional block diagram of a telephone-based token system 1800. Telephone-based token system 1800 may include both a data network 260 that is described in FIG. 2 by which multiple computers, such as computers A, B, C, and D, are connected and also a pre-established communication channel which in this embodiment may be a public telephone network. Computers A, B, C, and D may be associated with Users A, B, C, and D, respectively, and telephones 1810A, 1810B, 1810C, and 1810D, respectively. Telephones 1810A, 1810B, 1810C, and 1810D may be connected to computers A, B, C, and D, respectively, via modems 1820A, 1820B, 1820C, and 1820D, respectively. Each modem 1820 may be, for example, a USB modem. In this embodiment, a certain button on each telephone 1810 may be pressed in order to send and receive the identity token over the established voice connection. A telephone-based token system is particularly suited for social networking applications. Telephone-based token system 1800 allows anonymous calling and call contact permissions that may be based on the online connection between user (the social graph), live and voicemail token exchanges. In this embodiment, users, such as Users A, B, C, and D, may be talking on the phone and automatically connected in a profile data sharing environment on their respective Computer interfaces because one user passed an inband token to another user.

Furthermore, as described in FIG. 12, each telephone 1810 may be a sound device that is used to capture ambient sound in the physical environment, which may be used as a non-spoofable unique identifier and, thus, provides an additional means for a unique security or authentication layer.

Referring to FIGS. 1 through 18, in another embodiment of the token device, the portable token device of the invention may be a wireless-only token device, a wired-only token device, or a combination wireless and wired token device.

Referring to FIGS. 1 through 18, while embodiments of the invention have been described as both the sending and receiving parties, such as both User A and User B, being registered user-subscribers, alternatively, the invention may provide usefulness with at least one registered user-subscriber. For example, if User A is registered, whereby User A's profile information is stored by service provider, and User B is not registered, User A may not be able to receive User B's information following the exchange. However, User B may still be able to receive User A's profile information because User B has a device that has an associated identification. Optionally, User B may choose to register later and, thereby, enable User A to receive User B's information.

Referring to FIGS. 1 through 18, in another embodiment of the token device, the token device may include a time component, such as the capability to provide a timestamp (e.g., time/date stamp) and/or a timer function. In one example, the token device may include internal date and time capability, such as via processor 238, in order to generate a timestamp. Alternatively, the date and time for generating a timestamp may be acquired from a third party, such as from a network entity to which the token device may be connected. Additionally, the token device may include a simple internal timer device that, once triggered and then stopped, is able to measure and record an elapsed time period for any purpose.

Accordingly, a timestamp may be attached to any data transmission, such as to any exchange of tokens, adding further uniqueness to the token ID as the timestamp changes with every transmission. In one example, the token devices of two or more users capture a timestamp via any of the above-mentioned methods. For example, two parties may capture substantially the same time and date and generate a token that has substantially the same timestamp. The users may then return to their personal computer and exchange tokens based on a substantially matching timestamp, within some tolerance. Optionally, the local IP address of the network entity from which the date and time is captured may be attached to the timestamp for further matching.

In the case of an internal timer, the internal timer may record, for example, the elapsed time that User A is in communication with User B, such as during a one-to-one token exchange operation. By monitoring the communications protocol, the timer may be activated upon the data transfer between two devices being initiated and deactivated upon completion of the data transfer. The timer value may be appended to the end of the transmission and included in the token exchange data. The users may then return their personal computer and exchange tokens based on a substantially matching timer values, within a practical tolerance. Alternatively, each token device may include a dedicated mechanism for generating a time value, such as a dedicated button or switch. In this example, two or more users may have to coordinate their actions to substantially synchronize (within a practical tolerance) the activation of the dedicated timer mechanism.

Referring to FIGS. 1 through 18, while embodiments of the invention have been described as providing one token sending/receiving device for each separate user-subscriber, alternatively, one token device may be shared by two or more user-subscribers without departing from the spirit and scope of the invention. Additionally, while preferably the token exchange is at least a two-way exchange, alternatively, the token exchange may be one way only, i.e., one user authenticates his/her token to another user, while the other user does not reciprocate by authenticating his/her token in return.

Referring to FIGS. 1 through 18, in another embodiment of the token device, the token device may have separate transmit and receive modes. That is, data is sent in one mode and data is received in a different mode. Alternatively, one user's token device may transmit/receive data using one type of transmission technology, such as IR or RF, and another user's token device may transmit/receive data using another type of transmission technology, such as ultrasonic. Certain token devices may include multiple types of transmission capability, such as any combination of transmission technologies (e.g., broadband, IR, RF, ultrasonic, wired, etc) that are described in FIGS. 1 through 18.

Referring to FIGS. 1 through 18, in another embodiment of the token device, rather than having a fixed ID, token devices may include an algorithm for calculating a new code on-the-fly that may be based, for example, upon the unique IDs of two devices that are exchanging information. In one example, a new unique shared code may be generated by the combination of User A's ID and User B's ID plus any calculation therewith in order to create a shared code, such as User A's ID plus User B's ID multiplied by 3, User A's ID multiplied by User B's ID, and so on. The algorithm for creating a unique code on-the-fly, reduces, preferably eliminates, the need for any user to exchange his/her actual ID code with another user. After the operation to generate a new code is complete, the actual IDs of the respective users may be deleted from the token devices and replaced with the new shared code. In this way, each user's code is not being stored on other user's token devices, thereby providing another level of anonymity.

Referring to FIGS. 1 through 18, in another embodiment of the token device, rather than requiring that each user press his/her transmit button, such as transmit button 222 of token device 210, in order to initiate an exchange of information, each token device may have an "auto-exchange" mode of operation by which exchanges may occur automatically without user action. For example, the token devices may be transmitting a beacon (e.g., via Wi-Fi, IR, RF, etc) and when two or more token devices detect one another within their respective transmission ranges, the token devices automatically exchange tokens. Optionally, a switch may be provided for enabling/disabling the auto-exchange mode of operation.

Referring to FIGS. 1 through 18, in another embodiment of the invention, instead of the service provider maintaining and storing the user profiles, the user profiles may be stored at another location (i.e., a location other than the service provider's location) and/or on a separate device. For instance, the user profiles may be stored at some other location, such as a hosting location or third party intermediary. A communication link is maintained between the service provider and the device and/or entity that are storing the user profiles. By way of example, a "profiles database" may be added to the secure data retrieval system 800 that is described in FIG. 8. In this example, databases 820 and 830 of FIG. 8 are linked to the "profiles database" in order to access the user profile data.

Referring to FIGS. 1 through 18, in another embodiment of the invention, instead of exchanging tokens when two or more users physically meet, the token exchange process may occur before the users physically meeting, then upon meeting the two or more users may verify the tokens. For example, certain users may be planning to attend the same concert, conference, tradeshow, and so on. Prior to the event, the users may, for example, access the event sponsor's website and download the tokens of the other attendees, albeit without specific information. Upon physically meeting at the event, the users may verify (i.e. through token exchange) each other's identity. In this embodiment, the order of operations is modified, instead of (1) meeting in person, followed by (2) exchanging tokens, and followed by (3) exchanging user profiles at their personal computer, the order of operations may be (1) exchanging tokens, followed by (2) meeting in person, and followed by (3) exchanging user profiles at their personal computer.

Alternatively, the pre-acquired tokens may be locked, and upon meeting at the event, the tokens may be unlocked. Alternatively, the event sponsor or service provider has the user profiles, which are initially locked, and upon meeting the users verify identity and then may return to their personal computer and use the token to unlock the user profiles of interest.

Referring to FIGS. 1 through 18, in another embodiment of the invention, the device identifications are associated with a second encryption key, instead of associated directly with the user's information. In one example, an intermediary encryption key, such as the well-known public key infrastructure (PKI), may be utilized.

Referring to FIGS. 1 through 18, in another embodiment of the invention, instead of exchanging device identifications, two or more devices exchange small data files that contain the actual profile information, which may be encrypted. The profile information may be stored in memory on the individual devices and the service provider website may be used to provide the key to "unlocking" the received information following an exchange. For example, using the token devices, profile data is exchanged between two or more users. Subsequently, each user accesses the service provider website in order to unlock the exchange. In this embodiment, additional security may be provided in that it may not be required that complete profile information of all user-subscribers be stored on a central server, which is potentially vulnerable to security threats. This embodiment of the invention may reduce and/or substantially eliminate the need to formally register with the service provider by providing complete user profile information, because all personal profile information is managed locally not centrally.

Additionally, this embodiment of the invention may allow each user to control his/her outgoing profile information, such as to provide one-time profile information and/or provide perpetual profile updates. For example, each user may have multiple levels of control, such as to (1) turn on and off the ability of another user to access my his/her profile, (2) turn on and off the ability of another user to receive automatic profile update information, and (3) determine the granulation of their profile that may be seen by other users (e.g., provide a certain email address, physical address, and/or phone number only).

Referring to FIGS. 1 through 18, in another embodiment of the invention, instead of the user having a token device, such as token device 210, the user has a certain physical item that has a unique Quick Response (QR) code integrated thereon and/or therein. A QR code is a matrix code (or two-dimensional bar code) created in Japan that allows its contents to be decoded at high speed. QR codes that store addresses and URLs may appear, for example, in magazines, on signs, buses, and business cards.

In this embodiment, user-subscribers may have a QR code on any of their respective physical devices, such as on the surface of a cell phone, PDA, business card, keychain, and so on. The QR code may be used as the mechanism to provide unique wireless electronic device identification. Any user that has, for example, a camera phone that is equipped with the correct reader software may scan the image of the QR code of another user, which, in the context of the invention, may be used for verifying user identity. More specifically, stored on the database of the authentication server are the QR codes of the user-subscribers. Following the physical meeting of two or more users, the QR codes are used for making contact between users via the service provider, in substantially the same way that the exchange of tokens allows two or more users to make contact.

Referring to FIGS. 1 through 18, because one of the authentication values in the token values is that the transaction occurred, in another embodiment of the invention, a digital autograph may be passed. An example of a digital autograph is a digital celebrity autograph. For example, because users are apt to share such things in the interface of their social network application, the systems and methods of the invention provide a unique way for the users to display an authentication from a token service provider that the user really did meet, for example, his/her favorite celebrity.

Referring to FIGS. 1 through 18, in another embodiment of the invention, the token device identification may be stored on a magnetic stripe. In this embodiment, the token device is a one-way device, meaning that it may act as a sender only device. The magnetic stripe may be, for example, any magnetic stripe that is capable of storing data, such as those commonly used on magnetic stripe cards (e.g., credit cards, identity cards, and transportation tickets). The magnetic stripe may be read by physical contact and swiping past a reading head, as is well known. In this one-way scenario, the magnetic stripe token device conveys access to the user-controlled profile/gateway, rather than a serving as a static identity only. For example, the use of the magnetic stripe token device may be used to verify that a certain user-subscriber visited a certain store.

Portions of the present invention may be conveniently implemented using a conventional general purpose or a specialized digital device, computer system, server, computer or microprocessor programmed according to the teachings of the present disclosure, as will be apparent to those skilled in the art of communication, computer and e-commerce.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage/recording medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Additionally, embodiments of the present invention may cover the operation of a wireless device, including software algorithms performed on a wireless device, or the operation of a computer system, including software algorithms performed on a server, database or other computer network configuration for implementing backend processing. Based on the above disclosure and the following claims, other arrangements, embodiments, implementations and equivalents will be evident to those skilled in the art.

What is claimed is:

1. An apparatus for controlling access based on transfer of information, the apparatus comprising:

at least one memory; and at least one processor, the at least one processor configured to:

receive, from a transferor device, an authentication token that uniquely identifies the transferor device;

analyze the authentication token in comparison to information about the transferor device in a data structure to verify that the authentication token corresponds to the transferor device; and change a status of the transferor device from being unauthorized to access a resource to being authorized to access the resource automatically in response to verifying that the authentication token corresponds to the transferor device.

2. The apparatus of claim 1, wherein the resource includes data stored in a data store, and wherein the transferor device being authorized to access the resource includes the transferor device being authorized to access the data through the data store.

3. The apparatus of claim 1, wherein the resource includes a geographical area with an entryway, and wherein the transferor device being authorized to access the resource includes a user associated with the transferor device being authorized to enter the geographical area through the entryway.

4. The apparatus of claim 1, wherein the resource includes a service controlled through a server, and wherein the transferor device being authorized to access the resource includes a user associated with the transferor device being authorized to access the service through the server.

5. The apparatus of claim 1, wherein the resource includes a transaction controlled through a transaction terminal, and wherein the transferor device being authorized to access the resource includes a user associated with the transferor device being authorized to participate in the transaction through the transaction terminal.

6. The apparatus of claim 1, further comprising:

a positioning receiver configured to identify a location;

wherein the at least one processor is configured to:

receive a device location of the transferor device; and authenticate that the device location is within a predetermined distance of the location, wherein changing the status of the transferor device is also based on authenticating that the device location is within the predetermined distance of the location.

7. The apparatus of claim 1, the at least one processor configured to:

receive, from the transferor device, a time of transmission of the authentication token from the transferor device;

identify a time of receipt of the authentication token; and authenticate that the time of transmission of the authentication token is within a predetermined time of the time of receipt of the authentication token, wherein changing the status of the transferor device is also based on authenticating that the time of transmission of the authentication token is within a predetermined time of the time of receipt of the authentication token.

8. The apparatus of claim 1, the at least one processor configured to:

receive, from the transferor device, an indication of a user interface input at the transferor device;

identify a time of receipt of the authentication token; and authenticate that the time of transmission of the authentication token is within a predetermined time of the time of receipt of the authentication token, wherein changing the status of the transferor device is also based on authenticating that the time of transmission of the authentication token is within a predetermined time of the time of receipt of the authentication token.

9. The apparatus of claim 1, the at least one processor configured to:

store a shared secret;

receive, from the transferor device, an indication of the shared secret; and authenticate, based on the indication, that the transferor device has access to the shared secret, wherein changing the status of the transferor device is also based on authenticating that the transferor device has access to the shared secret.

10. The apparatus of claim 1, wherein, to receive the authentication token from the transferor device, the at least one processor configured to:

capture an image of an optical code using a camera; and decode the authentication token from the optical code.

11. The apparatus of claim 10, wherein the optical code is coupled to a housing of the transferor device.

12. The apparatus of claim 10, wherein the optical code is displayed using a display of the transferor device.

13. The apparatus of claim 1, the at least one processor configured to:

transmit, to the transferor device, a second authentication token that uniquely identifies the apparatus; and receive a confirmation that the transferor device has analyzed the second authentication token, wherein changing the status of the transferor device is also based on receipt of the confirmation.

14. The apparatus of claim 1, the at least one processor configured to:

display an optical code using a display, the optical code encoding a second authentication token that uniquely identifies the apparatus; and receive a confirmation that the transferor device has captured an image of the optical code and decoded the second authentication token from the optical code, wherein changing the status of the transferor device is also based on receipt of the confirmation.

15. A method for controlling access based on transfer of information, the method comprising:

receiving, from a transferor device, an authentication token that uniquely identifies the transferor device;

analyzing the authentication token in comparison to information about the transferor device in a data structure to verify that the authentication token corresponds to the transferor device; and changing a status of the transferor device from being unauthorized to access a resource to being authorized to access the resource automatically in response to verifying that the authentication token corresponds to the transferor device.

16. The method of claim 15, wherein the resource includes data stored in a data store, and wherein the transferor device being authorized to access the resource includes the transferor device being authorized to access the data through the data store.

17. The method of claim 15, wherein the resource includes a geographical area with an entryway, and wherein the transferor device being authorized to access the resource includes a user associated with the transferor device being authorized to enter the geographical area through the entryway.

18. The method of claim 15, wherein the resource includes a service controlled through a server, and wherein the transferor device being authorized to access the resource includes a user associated with the transferor device being authorized to access the service through the server.

19. The method of claim 15, wherein the resource includes a transaction controlled through a transaction terminal, and wherein the transferor device being authorized to access the resource includes a user associated with the transferor device being authorized to participate in the transaction through the transaction terminal.

20. The method of claim 15, wherein receiving the authentication token from the transferor device includes:

capturing an image of an optical code using a camera; and decoding the authentication token from the optical code.

* * * * *